(12) United States Patent
Lin

(10) Patent No.: US 9,785,443 B2
(45) Date of Patent: Oct. 10, 2017

(54) DATA CACHE SYSTEM AND METHOD

(71) Applicant: Shanghai XinHao Micro Electronics Co. Ltd., Shanghai (CN)

(72) Inventor: Kenneth Chenghao Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 182 days.

(21) Appl. No.: 14/775,517

(22) PCT Filed: Mar. 14, 2014

(86) PCT No.: PCT/CN2014/073445
§ 371 (c)(1),
(2) Date: Sep. 11, 2015

(87) PCT Pub. No.: WO2014/139466
PCT Pub. Date: Sep. 18, 2014

(65) Prior Publication Data
US 2016/0026469 A1    Jan. 28, 2016

(30) Foreign Application Priority Data

Mar. 15, 2013 (CN) .......................... 2013 1 0086817

(51) Int. Cl.
*G06F 9/30* (2006.01)
*G06F 9/38* (2006.01)
(Continued)

(52) U.S. Cl.
CPC ........ *G06F 9/3804* (2013.01); *G06F 9/30058* (2013.01); *G06F 9/38* (2013.01);
(Continued)

(58) Field of Classification Search
None
See application file for complete search history.

(56) References Cited

U.S. PATENT DOCUMENTS

2006/0271712 A1* 11/2006 Wezelenburg ........ G06F 9/5016
710/22
2015/0370569 A1* 12/2015 Lin ....................... G06F 9/3804
712/214

FOREIGN PATENT DOCUMENTS

| CN | 1560736 A | 1/2005 |
|---|---|---|
| CN | 1957326 A | 5/2007 |
| EP | 1217502 B1 | 3/2007 |

OTHER PUBLICATIONS

The World Intellectual Property Organization (WIPO) International Search Report for PCT/CN2014/073445 Jun. 4, 2015.

* cited by examiner

*Primary Examiner* — William B Partridge
(74) *Attorney, Agent, or Firm* — Anova Law Group, PLLC

(57) ABSTRACT

A data cache system is provided. The system includes a central processing unit (CPU), a memory system, an instruction track table, a tracker and a data engine. The CPU is configured to execute instructions and read data. The memory system is configured to store the instructions and the data. The instruction track table is configured to store corresponding information of branch instructions stored in the memory system. The tracker is configured to point to a first data read instruction after an instruction currently being executed by the CPU. The data engine is configured to calculate a data address in advance before the CPU executes the data read instruction pointed to by the tracker. Further, (Continued)

the data engine is also configured to control the memory system to provide the corresponding data for the CPU based on the data address.

41 Claims, 9 Drawing Sheets

(51) Int. Cl.
 *G06F 12/0862* (2016.01)
 *G06F 12/0875* (2016.01)
(52) U.S. Cl.
 CPC ...... *G06F 12/0862* (2013.01); *G06F 12/0875* (2013.01); *G06F 2212/452* (2013.01); *G06F 2212/6022* (2013.01)

DATA CACHE SYSTEM AND METHOD

CROSS-REFERENCES TO RELATED APPLICATIONS

This application is a national phase entry under 35 U.S.C. §371 of International Application No. PCT/CN2014/073445, filed on Mar. 14, 2014, which claims priority of Chinese Patent Application No. 201310086817.0, filed on Mar. 15, 2013, the entire contents of which are incorporated by reference herein.

FIELD OF THE INVENTION

The present invention generally relates to the fields of computer architecture technologies and, more particularly, to the systems and methods for data cache.

BACKGROUND

In general, cache is used to duplicate a certain part of main memory, so that the duplicated part in the cache can be accessed by a processor core or a central processing unit (CPU) core in a short amount of time and thus to ensure continued pipeline operation of the processor core.

Currently, cache addressing is based on the following ways. First, an index part of an address is used to read out a tag from a tag memory. At the same time, the index and an offset part of the address are used to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For a multi-way set associative cache, the above operations are performed in parallel on each set to detect which way has a cache hit. Contents read out from the set with the cache hit are valid. If all sets experience cache misses, contents read out from any set are invalid. After a cache miss, cache control logic fills the cache with contents from lower level storage medium.

Under existing cache structures, various cache prefetching technologies are used to reduce cache miss rate. The cache prefetching technologies can increase certain performance of an instruction cache. However, due to the uncertainty of data addresses in a data cache, it is difficult to effectively predict data addresses in the data cache. Therefore, with the widening gap between the speed of the processor and the speed of the memory, the data cache miss is still a serious bottleneck in increasing the performance of modern processors or computing systems.

The disclosed system and method are directed to solve one or more problems set forth above and other problems.

BRIEF SUMMARY OF THE DISCLOSURE

One aspect of the present disclosure includes a data cache system. The system includes a central processing unit (CPU), a memory system, an instruction track table, a tracker and a data engine. The CPU is configured to execute instructions and read data. The memory system is configured to store the instructions and the data. The instruction track table is configured to store corresponding information of branch instructions stored in the memory system. The tracker is configured to point to a first data read instruction after an instruction currently being executed by the CPU. The data engine is configured to calculate a data address in advance before the CPU executes the data read instruction pointed to by the tracker. Further, the data engine is also configured to control the memory system to provide the corresponding data for the CPU based on the data address.

Another aspect of the present disclosure includes a data cache method. The method includes storing instructions and data in a memory system, finding a first data read instruction after an instruction currently being executed by a CPU. The method also includes calculating a data address in advance before the CPU executes the data read instruction. Further, the method includes, based on the data address, controlling the memory system to provide the corresponding data for the CPU.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. The same reference numbers may be used throughout the drawings to refer to the same or like parts.

Figure 1:
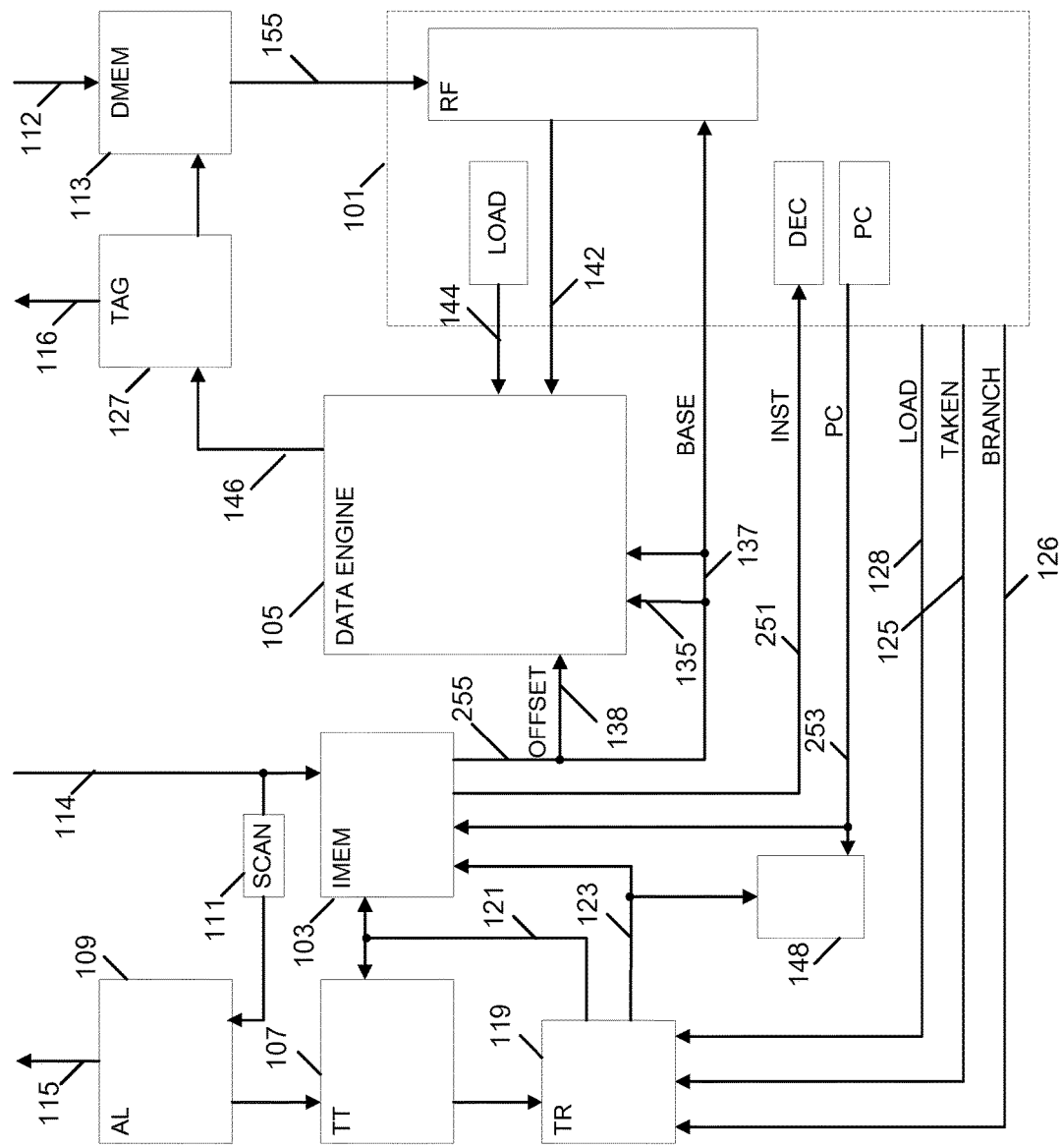
FIG. 1 illustrates a schematic diagram of an exemplary data cache system consistent with the disclosed embodiments.

FIG. 1 shows an exemplary data cache system. As shown in FIG. 1, the data cache system may include a processor (also known as central processing unit or processor core) 101, a data engine 105, an active list 109, a data block address storage comparator 127, a scanner 111, an instruction track table 107, a tracker 119, an instruction cache 103, a data cache 113 and a time point detection module 148. It is understood that the disclosed components or devices are for illustrative purposes and not limiting, certain components or devices may be omitted and other components or devices may be included. Further, the various components may be distributed over multiple systems, may be physical or virtual, and may be implemented in hardware (e.g., integrated circuitry), software, or a combination of hardware and software.

The processor may include any appropriate processor unit capable of executing instructions and with cache systems (data cache and instruction cache). The processor may be General Processor, central processing unit (CPU), Microprogrammed Control Unit (MCU), Digital Signal Processor (DSP), Graphics Processing Unit (GPU), System on Chip (SOC), Application Specific Integrated Circuit (ASIC), and so on.

The level of a memory refers to the closeness of the memory in coupling with CPU 101. The closer to CPU 101, the higher the level. The closer a memory is located to the, the higher level the memory is. Further, a higher level memory (instruction cache 103 and data cache 113) and a lower level memory may include any appropriate memory devices, such as SRAM, DRAM, and flash memory. Further, a memory with a higher level is generally faster in speed while smaller in size than a memory with a lower level. In addition, a relation among all levels of memory is an inclusion relation, that is, the lower level memory contains all storage content of the higher level memory.

A branch instruction or a branch point refers to any appropriate instruction type that may make the CPU 101 to change an execution flow (e.g., an instruction is not executed in sequence). The branch instruction or branch source means an instruction that executes a branch operation. A branch source address may refer to the address of the branch instruction itself; branch target may refer to the target instruction being branched to by a branch instruction; a branch target address may refer to the address being branched to if the branch is taken, that is, the instruction address of the branch target instruction. A data read instruction refers to any appropriate instruction form that can cause CPU 101 to read data from memory, such as a LOAD instruction. The instruction format of the data read instruction generally contains a base register number and an address offset. The data needed by a data read instruction refers to data that is read when CPU 101 executes a data read instruction. The data address of a data read instruction refers to an address that is used when CPU 101 executes a data read instruction to read/write data.

When CPU 101 executes a data read instruction, a data address is calculated by adding an address offset to a base register number. A base register updating instruction refers to an instruction that updates any base register value used likely by the data read instruction. The current instruction may refer to the instruction being executed or obtained currently by the CPU. The current instruction block may refer to the instruction block containing the instruction being executed currently by the CPU.

As used herein, the term "fill" means to move instructions/data from an external memory to an instruction cache/data cache in advance before the CPU executes an instruction, and the term "memory access" means that CPU reads from or writes to the closest memory.

There is a one-to-one correspondence between a row in the instruction track table 107 and a memory block in the instruction cache 103. Both the row and the memory block are pointed to by the same pointer. The track table 107 includes a plurality of track points. A track point is a single entry in the instruction track table 107 containing information of at least one instruction, such as instruction type information, branch target address, etc. When a track point contains information representing the track point corresponds to at least one branch instruction, the track point is a branch point. And the information may be a branch target address, etc. A track address of the track point is a track table address of the track point, and the track address is constituted by a row address and a column address. The track address of the track point corresponds to the instruction address of the instruction represented by the track point. The track point (i.e., branch point) of the branch instruction contains the track address of the branch target instruction of the branch instruction in the instruction track table 107, and the track address corresponds to the instruction address of the branch target instruction.

The instruction cache 103 not only stores instructions to be executed likely by CPU 101, but also instruction type information corresponding to every instruction. For example, the instruction type information may include information whether the instruction is data read instruction; the instruction type information may also indicate which kind of data read instruction the corresponding instruction is, thus containing how to calculate a data address such as base register number, and address offset, etc.

For illustrative purposes, BN represents a track address. BNX represents a row address of the track address of the branch point. That is, BNX corresponds to the position of one memory block or memory line containing the instruction (i.e., a row number of the memory block). A column address of the track address corresponds to the offset of one memory block or memory line containing the branch instruction. Accordingly, each group containing BNX and the column address also corresponds to a track point in the instruction track table 107. That is, a corresponding branch point can be found in the instruction track table 107 according to the group containing BNX and the column address.

When an instruction corresponding to a track point is a branch instruction (in other words, the instruction type information of the track point indicates the corresponding instruction is an branch instruction), the track point of the instruction track table 107 also stores position information of the branch target instruction of the branch instruction in the instruction cache 103 that is indicated by a track address. Based on the track address, the position of a track point corresponding to the branch target instruction can be found in the instruction track table 107. For the branch point of in the instruction track table 107, the track table address is the track address corresponding to the branch source address, and the contents of the track table contain the track address corresponding to the branch target address.

In certain embodiments, a total entry number of active list 109 is the same as a total cache block number of instruction cache 103 such that a one-to-one relationship can be established between entries in active list 109 and cache blocks in instruction cache 103. Every entry in active list 109 indicating the position of the instruction cache block stored in instruction cache 103 corresponding to the row of active list 109, thus a one-to-one relationship can be established between BNX and the instruction cache block. Each entry in active list 109 stores a block address of the instruction cache block. Thus, when an instruction address is used to perform a matching operation in active list 109, BNX stored in the matched entry or a result indicating that the match is unsuccessful can be obtained.

Every cache block in of data cache 113 is represented by a cache block number such that a one-to-one relationship can be established between entries in data block address storage comparator 127 and cache blocks in of data cache 113. Every entry in data block address storage comparator 127 stores a block address of the corresponding cache block in data cache 113 such that a one-to-one relationship can be established between data block addresses and data cache block numbers. Thus, when a data address is used to perform a matching operation in data block address storage comparator 127, a cache block number stored in the matched entry or a result indicating that the match is unsuccessful can be obtained.

The scanner 111 may examine every instruction sent from an external storage to instruction cache 103. If the scanner 111 finds an instruction is a branch instruction, the branch target address of the branch instruction is calculated. For example, the branch target address may be calculated by the sum of the block address of the instruction block containing the branch instruction, the block offset of the instruction block containing the branch instruction, and a branch offset.

The branch target instruction address calculated by the scanner 111 matches with the row address of the memory block stored in the active list 109. If there is a match (that is, it indicates that the branch target instruction is stored in instruction cache 103), the active list 109 outputs the BNX to the instruction track table 107 to fill to the entry corresponding to the branch instruction. If there is no match (that is, it indicates that the branch target instruction is not stored in instruction cache 103), the branch target instruction address is sent to an external memory via bus 115. At the same time, one entry is assigned in active list 109 to store the corresponding block address. The BNX is outputted and sent to the instruction track table 107. The corresponding instruction block sent from the external memory is filled to the cache block corresponding to the BNX in instruction cache 103 via bus 114. The corresponding track is built in the corresponding row of the instruction track table 107. The branch target instruction address of the branch instruction in the instruction block outputs a BNX after the matching operation is performed in the active list 109. The position of the branch target instruction in the instruction block (i.e. the offset of the branch target instruction address) is a column number of the corresponding track point. Thus, the track address corresponding to the branch target instruction is obtained. The track address as the content of the track point is stored in the track point corresponding to the branch instruction.

Accordingly, the position of the data read instruction in the instruction block (that is, the offset part of the branch target instruction address) is a column number corresponds to a data point. In addition, when the scanner 111 may examine instruction blocks, if the scanner 111 finds an instruction is a data read instruction, the corresponding instruction type information is stored in instruction cache 103. Therefore, when an instruction block is filled to instruction cache 103, a track corresponding to the instruction block is established and information about data access is recorded.

The read pointer 121 of tracker 119 moves from the track point corresponding to the instruction executed currently in the instruction track table 107 until the read pointer 121 points to a the first branch point after the track point. At this time, the value of read pointer 121 is the track address of the branch source instruction, including BNX and a column number corresponding to the branch point. Based on the track address, the track address of the branch target instruction of the branch source instruction is read out from instruction track table 107. Thus, the read pointer 121 of the tracker 119 moves in advance from the track point corresponding to the instruction executed currently by the CPU 101 in the instruction track table 107 to the first branch point after the track point. The target instruction may be found in the instruction cache 103 based on the track address of the target instruction. The read pointer 123 of tracker 119 and BNX of the read pointer 123 together constitutes the track address for instruction cache 103. Based on the instruction type information recorded in instruction cache 103, the read pointer 123 of the tracker 119 moves in advance from the track point corresponding to the instruction executed currently in instruction cache 103 to the first data read instruction after the instruction, and reads out base register number 137 and address offset 138 corresponding to the data read instruction.

Instruction cache 103 supports multi-port read/write at the same time. When instruction 251 is provided for CPU 101 to decode based on instruction address 253, relevant information 255 for the data read instruction pointed to by read pointer 123 is outputted. The relevant information 255 includes base register number 137 and address offset 138 corresponding to the data read instruction. The data read instruction pointed to by read pointer 123 belongs to a current instruction block, so an instruction read buffer (IRB) is added. The instruction read buffer is configured to store at least one instruction block containing the current instruction block, and provides the stored instruction block for read pointer 123 to points to and read out relevant information. At this time, the instruction read buffer provides instructions for CPU 101 and provides relevant information 255 for the data read instruction for data engine 105; or the instruction read buffer provides instructions for CPU 101, and instruction cache 103 provides relevant information 255 for the data read instruction for data engine 105; or instruction cache 103 provides instructions for CPU 101, and the instruction read buffer provides relevant information 255 for the data read instruction for data engine 105.

Figure 2:
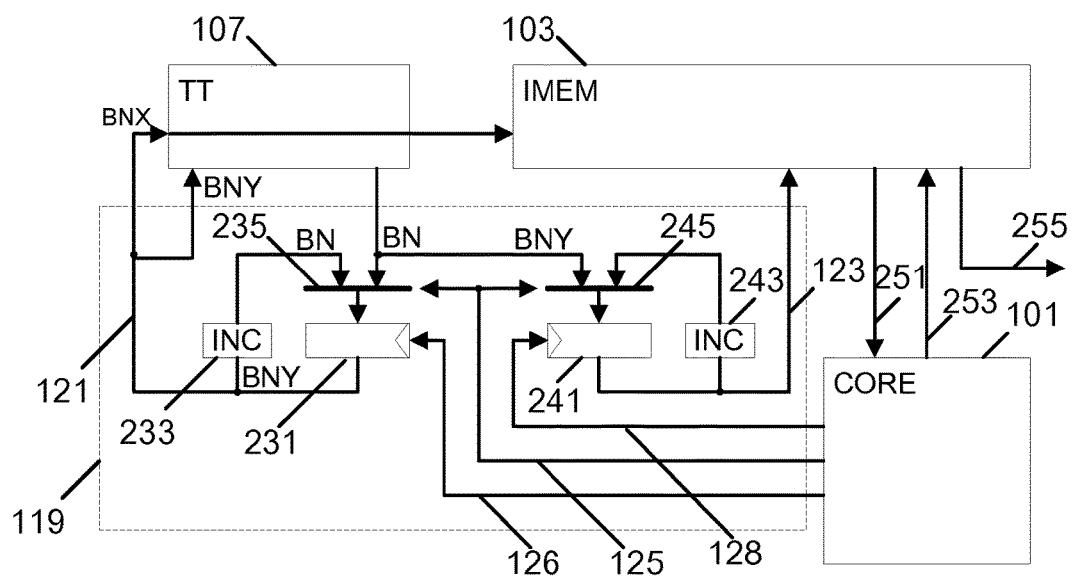
FIG. 2 illustrates a schematic diagram of an exemplary tracker consistent with the disclosed embodiments.

FIG. 2 illustrates a schematic diagram of an exemplary tracker consistent with the disclosed embodiments. In tracker 119, register 231, incrementer 233, and selector 235 together perform a tracking operation on track points of instruction track table 107; while register 241, incrementer 243, and selector 245 together perform a tracking operation on instruction cache 103. Register 231 stores track addresses for instruction track table 107. The output of the register 231 is read pointer 121 of the tracker 119. The read pointer 121 points to a track point of the instruction track table 107. When an instruction type read out by the read pointer 121 from instruction track table 107 is a non-branch instruction type, the BNX part of the track address of the register 231 is kept unchanged; while the column address part (i.e. BNY) of the track address is added 1 by incrementer 233 and is sent to selector 235. Because a TAKEN signal 125 representing whether a branch is taken indicates that no branch is taken at this time, selector 235 selects the column address which is added 1 to write back to register 231, such that the read pointer 121 moves and points to the next track point.

The read pointer 121 moves until the read pointer 121 points to a branch instruction. That is, the value of the read pointer 121 is a track address of the branch source instruction. The track address of the branch target instruction of the branch source instruction is read out from instruction track table 107 and is sent to the selector 235. Another input of the selector 235 is the track address that is added 1 and outputted by the read pointer 121 (that is, the read pointer 121 points to the track address of the track point after the branch point). Thus, the read pointer 121 of the tracker 119 moves in advance from the track point corresponding to the instruction executed currently by the CPU 101 to the first branch point after the track point. Based on the track address of the target instruction, the target instruction can be found in instruction cache 103. At this point, the register 231 stops updating and waits for CPU 101 to generate an execution result of the branch instruction.

Based on BNX of read pointer 121 and the low bit part 253 of the instruction address outputted by CPU 101, instruction 251 needed for CPU 101 is read out from instruction cache 103. Based on BNX of read pointer 121 and the column address of read pointer 123, relevant information 255 for the data read instruction pointed to by read pointer 123 is read out from instruction cache 103.

When CPU 101 executes the branch instruction, a TAKEN signal 125 is generated. If the TAKEN signal 125 indicates that no branch is taken, selector 235 selects the track address that is added 1 by the read pointer 121, and the selected track address is written back to register 231. Under the control of BRANCH signal 126 sent from CPU 101 which indicates that a branch instruction is executed completely, register 231 stores the track address that is added 1. The read pointer 121 continues to move along the current track to the next branch point. Further, the CPU 101 outputs the offset of instruction address to read the corresponding subsequent instruction from the cache block of instruction cache 103 pointed to by the read pointer 121.

If the TAKEN signal 125 indicates that the branch is taken, the selector 135 selects the track address of the branch target instruction outputted by the instruction track table 107, and the selected track address is written back to register 231. Under the control of BRANCH signal 126 sent from CPU 101 which indicates that a branch instruction is executed completely, register 231 stores the track address of the branch target instruction. The read pointer 121 points to the track point in the instruction track table 107 corresponding to the branch target instruction. The BNX of the read pointer 121 and the offset of instruction address 253 outputted by the CPU 101 together point to the branch target instruction in instruction cache 103. Therefore, the branch target instruction is outputted for CPU 101 to execute. According to the previous method, the read pointer 121 continues to move along the new current track (i.e. the track containing the original branch target instruction track point) to the next branch point. Further, the CPU 101 outputs the offset of instruction address to read the corresponding subsequent instruction from the cache block of instruction cache 103 pointed to by the read pointer 121.

It should be noted that an end track point may be added after the last track point of every track in the instruction track table 107. The type of the end track point is a branch that is bound to take. BNX of the content of the end track point is row address (i.e. BNX) of the next instruction block of the instruction block corresponding to the track in instruction track table 107. The column address of the target instruction stored in the end track point is '0'. Thus, if the tracker 119 starts to move from the last branch point of the track, the pointer points to the end track point and moves to the next instruction block.

Register 241 stores column address of the track address of the data access relevant information in instruction cache 103. The output of the register 241 is read pointer 123 of the tracker 119. The read pointer 123 points to instruction type information corresponding to an instruction in the instruction block pointed to by BNX of read pointer 121 in the instruction cache 103. When an instruction type read out by the read pointer 123 from the instruction cache 103 is a non-data read instruction type, the column address outputted by read pointer 123 is added 1 by incrementer 243 and is sent to selector 245. Because a TAKEN signal 125 representing whether a branch that is taken is invalid at this time, selector 245 selects a default input. That is, the column address after added 1 is written back to register 241, such that the read pointer 123 moves and points to the next instruction. The read pointer 123 moves until the read pointer 123 points to a data read instruction. Thus, the read pointer 123 of the tracker 119 moves in advance from the instruction executed currently by the CPU 101 to the first data read instruction after the currently executed instruction, and reads out a base register number and an address offset corresponding to the data read instruction. At this point, the register 241 stops updating and waits for CPU 101 to generate an execution result of the data read instruction.

After CPU 101 executes the data read instruction completely, a LOAD signal 128 is generated. The LOAD signal 128 controls and updates register 241 to the track address added 1 outputted by selector 245. According to the previous method, the read pointer 123 continues to move along the current track to the next data read instruction.

Further, when CPU 101 executes the branch instruction and generates a TAKEN signal 125 indicating that a branch is taken, the selector 245 selects the track address of the branch target instruction outputted by instruction track table 107, and the track address is stored to register 241. The read pointer 123 points to the branch target instruction in instruction cache 103. According to the previous method, the read pointer 123 moves until read pointer 123 points to the first data read instruction after the branch target instruction, and reads out a base register number and an address offset corresponding to the data read instruction from instruction cache 103.

Returning to FIG. 1, based on the base register number read out from the instruction cache 103, data engine 105 can calculate a determination data address or a possible data address of data address 146 before CPU 101 executes the data read instruction, and control data cache 113 to output the corresponding data for the CPU 101 to execute.

In addition, data engine 105 also calculates the possible prediction data address when CPU 101 executes the data read instruction next time. Based on the prediction data address, the data block is read in advance from an external storage and filled to data cache 113. Therefore, all or part of data cache access latency is hidden, or all or part of waiting time caused by cache miss is hidden, improving the performance of the processing system.

Figure 3A:
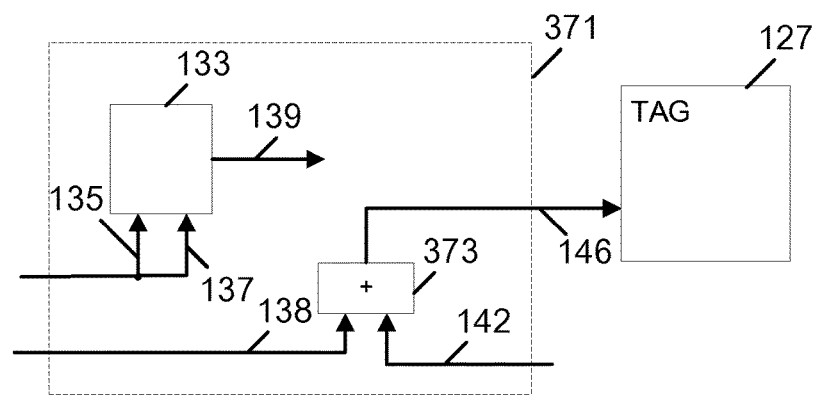
FIG. 3A illustrates a schematic diagram of an exemplary data engine consistent with the disclosed embodiments.

FIG. 3A illustrates a schematic diagram of an exemplary data engine consistent with the disclosed embodiments. As shown in FIG. 3A, data engine 371 contains an adder 373. One input of the adder 373 is address offset 138 of the data read instruction in instruction cache 103. Another input of the adder 373 is the base register value 142 outputted by CPU 101 based on the base register number of the data read instruction. The data address 146 outputted by the adder 373 is sent to data block address storage comparator 127 to perform an address matching operation. The number of cycles ahead of time may be obtained by adding the data cache access latency to the time needed for generating a new base address value by performing a base register updating instruction operation. For example, when the data cache access latency is 2 cycles and the time needed for generating a new base address value by performing a base register updating instruction operation is 1 cycle, the number of cycles ahead of time is 3.

Time point detection module 148 shown in FIG. 1 compares the value of read pointer 123 with the current instruction address 253 sent by CPU 101. When the value of read pointer 123 is equal to the current instruction address plus 3 (that is, it indicates the time point for CPU 101 performing the data read instruction is ahead of 3 cycles), the data address is calculated and the output 139 of judgment module 133 controls data cache 113 to provide data for CPU 101, such that the data cache access latency is hidden. At this time, the output 139 of judgment module 133 indicates whether the used base register value is the updated value when adder 373 calculates the data address, thus judgment module 133 determines whether data address 146 outputted by adder 373 can be used to perform an address matching operation in data block address storage comparator 127 to complete the subsequent operations.

For the data read instruction after the branch target instruction of the branch target instruction block, when the branch is taken, the instruction address points to the branch target instruction. Thus, the distance between the instruction address and the data read instruction address is less than '3', so the above method can still be used to control the data cache 113 to provide in advance instructions for CPU 101.

Judgment module 133 is configured to determine correlation between the register of the data read instruction and registers of a number of the instructions before the data read instruction to determine whether the corresponding base register value is updated to the base register value that is needed by the data read instruction.

Figure 3B:
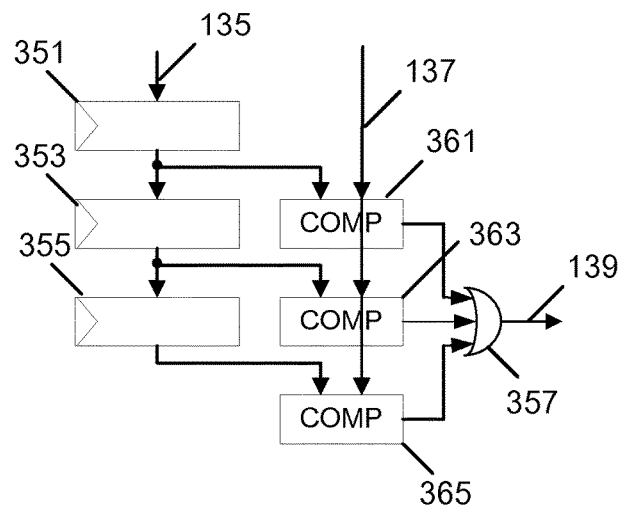
FIG. 3B illustrates a schematic diagram of an exemplary judgment module consistent with the disclosed embodiments.

FIG. 3B illustrates a schematic diagram of an exemplary judgment module consistent with the disclosed embodiments. The judgment of the correlation between the register of the data read instruction and registers of 3 instructions before the data read instruction is described as an example herein. In the case of more instructions, similar methods can be used to implement the function.

As shown in FIG. 3B, when read pointer 123 of tracker 119 moves, target register numbers of instructions passed by read pointer 123 are sent to register 351 via bus 135 in turn. Register 351, register 353 and register 355 together constitute a first in first out (FIFO) structure. Thus, registers 351, register 353 and register 355 store the target register number of the first instruction before the instruction currently pointed to by read pointer 123, the target register number of the second instruction before the instruction currently pointed to by read pointer 123 and the target register number of the third instruction before the instruction currently pointed to by read pointer 123, respectively. The outputs of the three registers are sent respectively to comparator 361, comparator 363 and comparator 365 as an input. The source register number needed by the instruction currently pointed to by read pointer 123 are sent respectively to comparator 361, comparator 363 and comparator 365 as another input via bus 137.

When the instruction currently pointed to by read pointer 123 is a data read instruction, the source register number is the base register number. The three comparators compare the two inputs respectively, and the comparison results are sent to OR gate 357 to perform an OR operation.

If a comparison result outputted by any comparator is equal (that is, it indicates that base register number of the data read instruction and the target register number of the instruction represented by the register corresponding to the comparator are the same), the data address calculated by adder 373 before the instruction completes updating the register is most likely wrong. At this time, output 139 of judgment module 133 indicates that current data address 146 cannot be used in data block address storage comparator 127 to perform an address matching operation.

If all comparison results outputted by the three comparators are unequal it indicates that base register number of the data read instruction and the target register numbers of three instructions represented respectively by the registers corresponding to the three comparators are all different (that is, the base register value is updated or does not need to be updated). Therefore, current data address 146 can be used to perform an address matching operation in data block address storage comparator 127. At this time, output 139 of judgment module 133 controls whether data block address storage comparator 127 performs an address matching operation or whether data cache 113 outputs the corresponding data.

Returning to FIG. 1 and combining the data engine shown in FIG. 3A, when the data read instruction pointed to by read pointer 123 of tracker 119 and a number of instructions before the data read instruction have no correlation (or instructions with correlation update completely the base register), output 139 of judgment module 133 indicates that data block address storage comparator 127 performs a matching operation for data address 146. If the matching operation is successful (it indicates that the data corresponding to the data address is stored in data cache 113), the corresponding data can be read out from data cache 113 and provided for CPU 101 via bus 155 before CPU 101 executes the data read instruction; If the matching operation is unsuccessful (it indicates that the data corresponding to the data address is not stored in data cache 113), the data address is sent to an external memory via bus 116 to read out the corresponding data block. An entry is assigned in data block address storage comparator 127 to store the block address part of the data address. The data block read out via bus 112 is stored in the corresponding cache block in data cache 113, and the data corresponding to the data address is provided for CPU 101.

Thus, when CPU 101 needs to read an instruction, the corresponding instruction is sent to CPU 101 via bus 251 or is being filled to instruction cache 103. Similarly, when CPU 101 needs to read data, the corresponding data is sent to CPU 101 via bus 155 or is being filled to data cache 113, thereby hiding all or partial access latency of the cache and improving the performance of the instruction processing system.

Figure 3C:
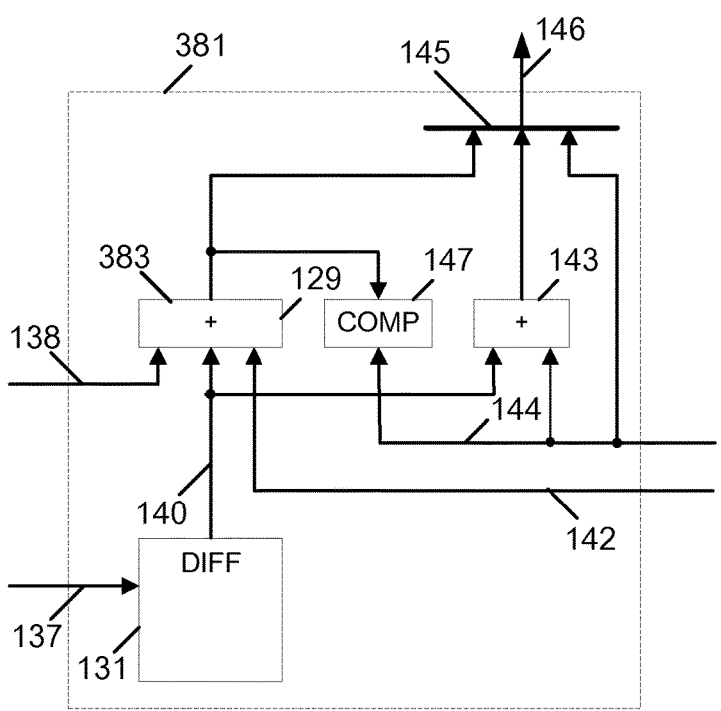
FIG. 3C illustrates a schematic diagram of another exemplary data engine consistent with the disclosed embodiments.

According to the present disclosure, the data engine can also be implemented by other methods. FIG. 3C illustrates a schematic diagram of another exemplary data engine consistent with the disclosed embodiments. As shown in FIG. 3C, in data engine 931, base address difference memory 131 are constituted by multiple registers, where each register corresponds to one base register and is configured to store Change difference of the corresponding base register. When the value of one base register changes, the value difference of the base register is calculated and stored in the appropriate register in base address difference memory 131.

Figure 3D:
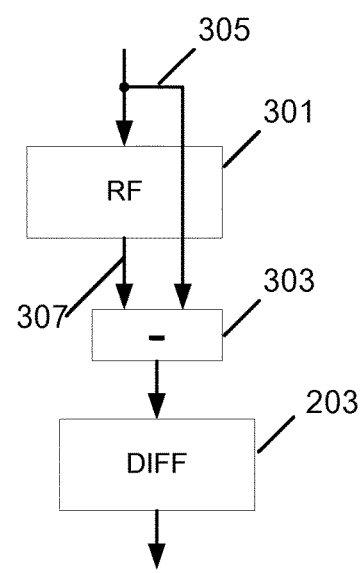
FIG. 3D illustrates a schematic diagram of calculating a base address difference value consistent with the disclosed embodiments.

FIG. 3D illustrates a schematic diagram of calculating a base address difference value consistent with the disclosed embodiments. As shown in FIG. 3D, register file 301 of CPU 101 has a read port. When updating a register value in the register file 301, the original register value can be read out from the read port and sent to subtractor 303 via bus 307. At the same time, a new value being stored in the register is sent to subtractor 303 via bus 305. The base address difference value is obtained by subtracting the new value from the original value using subtractor 303. The base address difference value is stored in the corresponding register in the base address difference memory 131.

Returning to FIG. 3C, according to the above described method, when CPU 101 executes instructions for updating the base register, base address difference memory 131 records base address difference values when all base register values change at the most recent time. The first input of adder 383 is data read instruction address offset 138 pointed to by read pointer 123 from instruction cache 103. The second input of adder 383 is a base address difference corresponding to base register number 137 of the data read instruction from base address difference memory 131. The third input of adder 383 is base register value 142 sent from CPU 101 based on base register number 137 of the data read instruction. The output of adder 383 is a data address and the outputted data address is sent to selector 145.

Similarly, when CPU 101 executes at a number of cycles before the data read instruction, after a possible data address calculated by adder 383 is selected by selector 145, the possible data address is sent to data block address storage comparator 127 to perform an address matching operation to complete the data read operation. At the same time, the possible data address is also sent to comparator 147 to store temporarily. The actual data address 144 generated when CPU 101 executes the data read instruction is sent to comparator 147 to compare with the possible data address stored temporarily in comparator 147. If the comparison result is equal (it indicates that the possible data address is correct), CPU 101 can directly read data provided in advance. Therefore, all or part of access latency of data cache 113 is hidden, or all or part of waiting time caused by data cache miss is hidden, improving the performance of the processing system. If the comparison result is unequal (it indicates that the possible data address is incorrect), selector 145 selects the actual data address 144 sent out by CPU 101 as the output data address 146 and the data address 146 is sent to data block address storage comparator 127 to perform an address matching operation to read out correct data. The following process is the same as the process described in the previous method, which is not repeated herein.

Of course, in the other embodiments, CPU 101 may not wait for the result generated by comparing the possible data address with the actual data address. Instead, CPU 101 may directly read data sent in advance and execute subsequent instructions to better reduce the instruction execution time. In this case, if the comparison result is equal, CPU 101 can continue to execute subsequent instructions. If the comparison result is unequal, based on the comparison result, CPU 101 clears the execution result obtained by processing the wrong data; and according to the previous described methods, CPU 101 re-reads the correct data and then executes subsequent instructions again.

Further, when CPU 101 executes the data read instruction, the outputted actual data address 144 is also sent to prediction address adder 143. The outputted actual data address 144 adds the corresponding base address difference value 140 sent from base address difference memory 131 to obtain a prediction data address for executing the data read instruction next time. After the prediction data address is selected by selector 145, the prediction data address is used as data address 146 and sent to data block address storage comparator 127 to perform a matching operation. If the match is unsuccessful, the data address via bus 116 is sent to an external memory to prefetch data block, and an entry is assigned in data block address storage comparator 127 to store the block address part of the data address. The prefetched data block is stored in the corresponding cache block in data cache 113. Thus, the required data is prefetched when the data read instruction is executed again, hiding a part or all waiting time caused by data cache miss.

Figure 4:
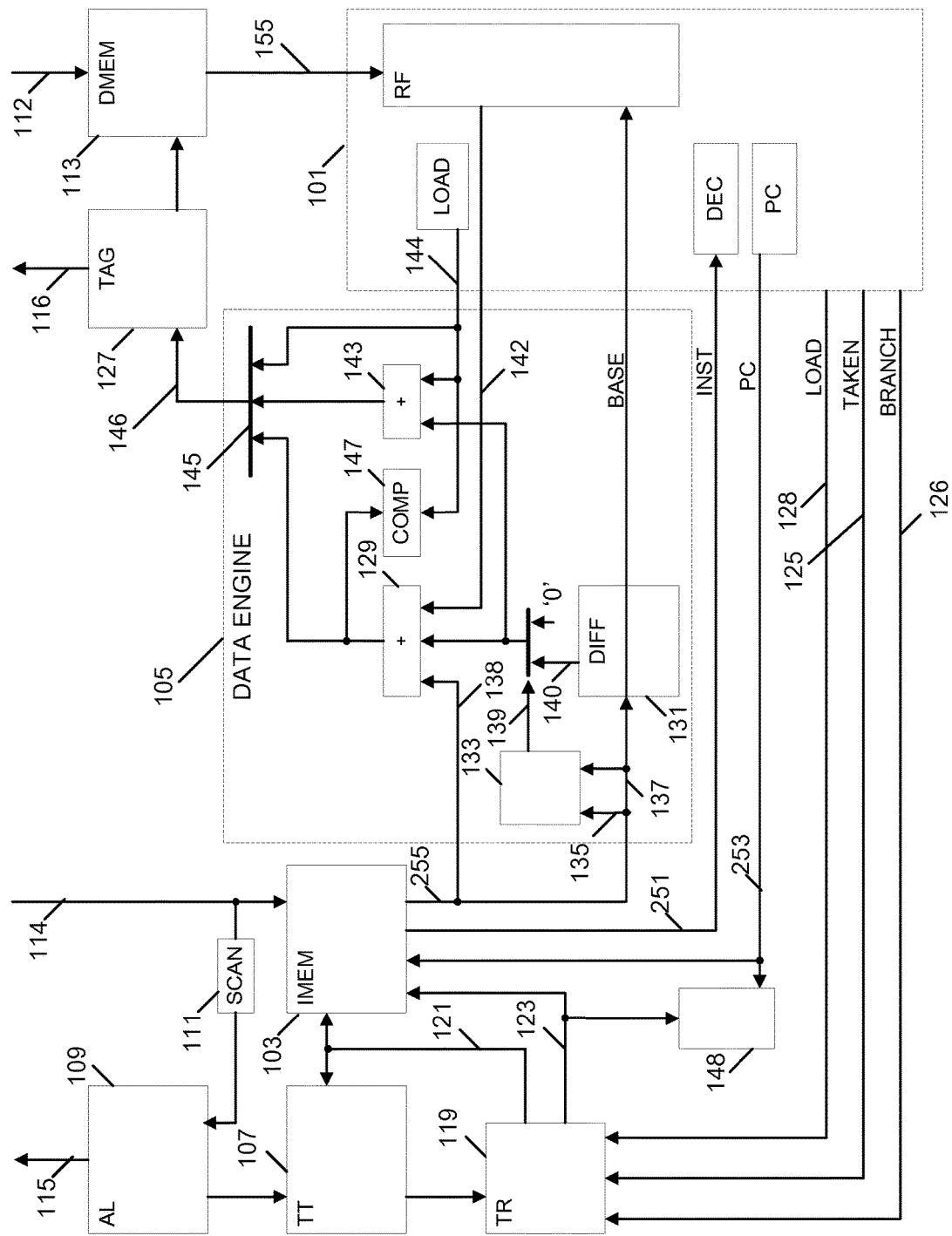
FIG. 4 illustrates a schematic diagram of another exemplary data cache system consistent with the disclosed embodiments.

A data engine may be used to implement data cache by combining the embodiments shown in FIG. 3A with the embodiments shown in FIG. 3C. FIG. 4 illustrates a schematic diagram of another exemplary data cache system consistent with the disclosed embodiments.

For illustration purposes, the data address obtained a number of cycles in advance by adding a base register value to an address offset controls the data cache to provide the data in advance for CPU 101 as an example. As shown in FIG. 4, based on the base register number 137 of the data read instruction read out from instruction cache 103, the corresponding base register value 142 can be obtained from CPU 101, and the corresponding base address difference value 140 is obtained from base address difference memory 131.

The first input of adder 129 is data read instruction address offset 138 read out from instruction cache 103. The second input of adder 129 is a value selected by selector 141 from base address difference value 140 and '0' based on output 139 of judgment module 133. The third input of adder 129 is base register value 142 sent from CPU 101. When the data address is calculated, if output 139 of judgment module 133 is '0', it indicates that the base register value is updated completely. At this time, selector 141 selects output '0' as the second input of adder 129. The output of adder 129 is a determination data address obtained by adding base register value 142 to address offset 138. If output 139 of judgment module 133 is '1', it indicates that the base register value is not updated completely. At this time, selector 141 selects the base address difference value 140 as the second input of adder 129. The output of adder 129 is a possible data address obtained by summing base register value 142, base address difference value 140 and address offset 138. The determination data address or the possible data address via bus 146 is sent to data block address storage comparator 127 to perform a matching operation to control data cache 113 to provide data for CPU 101.

The following process is similar to the process shown in FIG. 3C. The possible data address outputted by adder 129 is sent to comparator 147 and stored temporarily in comparator 147. The generated actual data address 144 when CPU 101 executes data read instruction is sent to comparator 147 to compare with the possible data address stored temporarily in comparator 147. If the comparison result is equal (it indicates that the possible data address is correct), CPU 101 can directly read data provided in advance. Therefore, all or part of access latency of data cache 113 is hidden, or all or part of waiting time caused by data cache miss is hidden, improving the performance of the processing system. If the comparison result is unequal (it indicates that the possible data address is incorrect), selector 145 selects actual data address 144 sent out by CPU 101 as the output data address 146 and sends data address 146 to data block addresses storage comparator 127 to perform an address matching operation to read out correct data.

Of course, in other embodiments, CPU 101 may not wait for the result generated by comparing the possible data address with the actual data address; instead, CPU 101 may directly read data sent in advance and execute subsequent instructions to better reduce the instruction execution time. Based on the comparison result, CPU 101 determines whether tore-read the correct data and re-execute subsequent instructions.

In addition, the process that adder 143 calculates a prediction data address and fills the data block is similar to the process in FIG. 3C, which are not repeated herein.

For various types of data read instructions, similar methods as shown in FIG. 4 can be used to provide data for CPU 101 in advance. Data that is possibly used is prefetched and filled to achieve performance improvement. Based on different data address calculation methods, the data read instructions are divided into: the data read instruction that obtains the data address by adding the base register value to the address offset (BASE+OFFSET); the data read instruction that uses the base register value (BASE) as the data address; the data read instruction that obtains the data address by adding the instruction address value to the address offset (PC+OFFSET); and the data read instruction that obtains the data address by adding multiple base register together. The program counter (PC) points to the current instruction being executed. For the last situation (that is, multiple base register values are added to obtain the data address), two base register values are added (BASE1+BASE2) as an example herein. The situation for adding more base register values may be implemented according to the above descripted method. Other data address calculation methods can be implemented by combining or extending the above four methods, which are not repeated here.

Figure 5A:
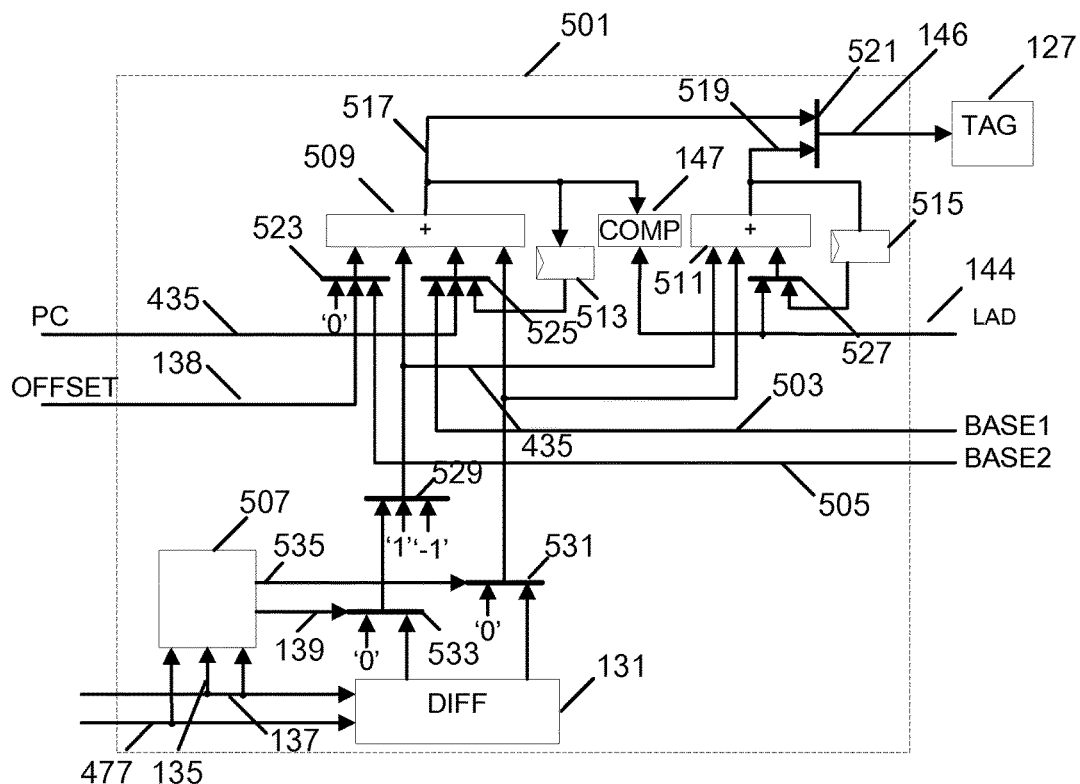
FIG. 5A illustrates a schematic diagram of another exemplary data engine consistent with the disclosed embodiments.

In addition, there is a corresponding processing method for a multiple data read instruction (that is, an instruction that can read multiple data from the multiple data addresses). FIG. 5A illustrates a schematic diagram of another exemplary data engine consistent with the disclosed embodiments. As shown in FIG. 5A, data engine 501 not only implements the above four data address calculation methods, but also supports generating the data addresses of the multiple data read instruction.

In FIG. 5A, adder 509 is configured to calculate data address 517 that controls data cache 113 to output data in advance, adder 511 is configured to calculate a prediction data address or provide actual data address 144 and send them to selector 521 via bus 519.

Figure 5B:
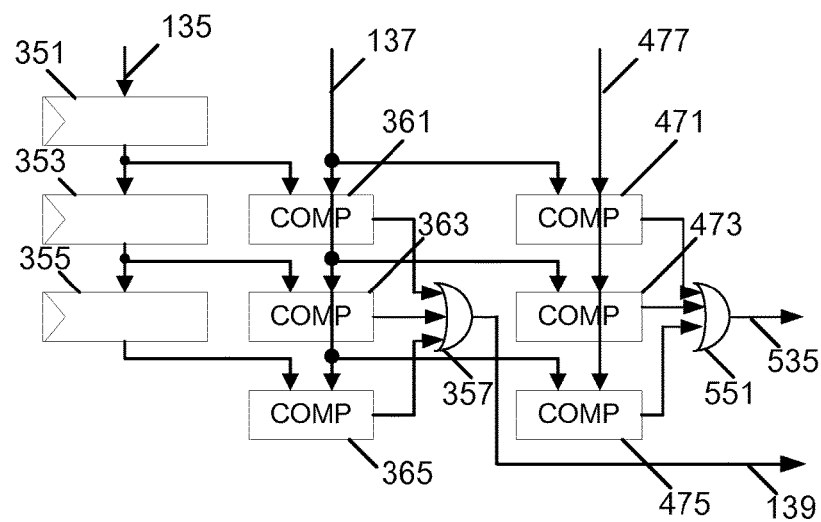
FIG. 5B illustrates a schematic diagram of another exemplary judgment module consistent with the disclosed embodiments.

Register 513 is configured to store temporally data address 517 and generate the next data address of the multiple data read instruction based on the data address 517. Register 515 is configured to store temporally data address 519 and generate the next data address of the multiple data read instruction based on the data address 519. FIG. 5B illustrates a structure of an exemplary judgment module 507 consistent with the disclosed embodiments.

As shown in FIG. 5B, the judgment of the correlation among registers of the data read instruction and the three instructions before the data read instruction is used as an example herein. Compared with the structure of judgment module shown in FIG. 3B, judgment module 507 adds a group of comparators (i.e. 3 comparators) and a 3-input logic OR gate 551. Register 351, register 353 and register 355 are the same as the corresponding parts in FIG. 3B. Register 351, register 353 and register 355 store the target register number of the first instruction, the target register number of the second instruction and the target register number of the third instruction before the instruction currently pointed to by read pointer 123, respectively. The outputs of the three registers are sent to comparator 361, comparator 363 and comparator 365 as an input, respectively. The first base register number of the instruction in instruction cache 103 currently pointed to by read pointer 123 via bus 137 is sent to the three comparators as another input to perform a comparison operation, respectively. The three comparison results are sent to 3-input logic OR gate 357 to perform a logic OR operation. At the same time, the outputs of these three registers are also sent to comparator 471, comparator 473 and comparator 475 as an input, respectively. The second base register number of the instruction in instruction cache 103 currently pointed to by read pointer 123 via bus 447 is sent to the three comparators as another input to perform a comparison operation, respectively. The three comparison results are sent to 3-input logic OR gate 551 to perform a logic OR operation. Thus, OR gate 357 outputs control information 139 corresponding to whether the first base register has relevance with the previous instructions; and OR gate 551 outputs control information 535 corresponding to whether the second base register has relevance with the previous instructions.

Returning to FIG. 5A, selection signal 535 and selection signal 139 outputted by judgment module 507 control selector 531 and selector 533, respectively. When one or all values of the two base address register are not updated completely, the corresponding base address difference value is selected as the output of the corresponding selector; otherwise, '0' is selected as the output of the corresponding selector.

For the data read instruction that obtains the data address by adding a base register value to an address offset, selector 523 selects the address offset 138 from instruction cache 103 as the first input of adder 509. Based on output 139 of judgment module 507, selector 533 selects base address difference value or '0' as an output and selector 529 selects the output as the second input of adder 509. Select 525 selects the first base register value 503 from CPU 101 as the third input of adder 509. Selector 531 selects '0' output as the fourth input of adder 509. Thus, if the base register value is not updated completely, the four inputs of adder 509 are address offset, base address difference value, base register value and '0', respectively. If the base register value is updated completely, the four inputs of adder 509 are address offset, '0', base register value and '0', respectively. After the output of adder 509 is selected by selector 521, the output is sent to data block address storage comparator 127 as data address 146. Thus, the data address may be obtained by adding a base register value to an address offset, which is the same as the calculation function in FIG. 4.

For the data read instruction that uses a base register value as a data address, selector 523 selects '0' as the first input of adder 509. Based on output 139 of judgment module 507, selector 533 selects base address difference value or '0' as an output and selector 529 selects the output as the second input of adder 509. Select 525 selects the first base register value 503 from CPU 101 as the third input of adder 509. Selector 531 selects '0' output as the fourth input of adder 509. Thus, if the base register value is not updated completely, the four inputs of adder 509 are '0', base address difference value, base register value and '0', respectively. If the base register value is updated completely, the four inputs of adder 509 are '0', '0', base register value and '0', respectively. After the output of adder 509 is selected by selector 521, the output is sent to data block address storage comparator 127 as data 146. Thus, the address calculation can be implemented using the base register value as a data address.

For the data read instruction that obtains the data address by adding an instruction address value to an address offset, the corresponding instruction type information is generated when scanning. When read pointer 123 points to the instruction, the BNX part of read pointer 121 indexes active table 109 to read out the address of the corresponding instruction block; and then the instruction address of the data read instruction is obtained by adding the instruction block address to the value of pointer 123 (i.e., column address of the data read instruction). Selector 523 selects the address offset as the first input of adder 509. Selector 533 selects '0' as an output and selector 529 selects the output as the second input of adder 509. Select 525 selects instruction address 435 of the data read instruction as the third input of adder 509. Selector 531 selects '0' output as the fourth input of adder 509. Thus, the four inputs of adder 509 are address offset, '0', the address of the data read instruction and '0', respectively. After the output of adder 509 is selected by selector 521, the output is sent to data block address storage comparator 127 as data address 146. Thus, the data address may be obtained by adding an instruction address value to an address offset.

In the above three types of situations, when CPU 101 executes the data read instruction to generate actual data address 144, selector 533 selects the base address difference value as an output. The output is then selected by selector 529 as the first input of adder 511. Selector 531 selects '0' output as the second input of adder 511. Select 527 selects actual data address 144 as the third input of adder 511. At this point, the output of adder 511 is prediction data address 519 corresponding to the data read instruction. The prediction data address 519 that is selected by selector 521 is sent to the data block address storage comparator 127 to control the filling of data cache 113.

For the data read instruction that obtains the data address by adding two base register values, selector 523 selects the second base register value 505 from CPU 101 as the first input of adder 509. Based on output 139 of judgment module 507, selector 533 selects the first base address difference value or '0' as an output and selector 529 selects the output as the second input of adder 509. Selector 525 selects the first base register value 503 from CPU 101 as the third input of adder 509. Based on output 535 of judgment module 507, selector 531 selects the second base address difference value or '0' output as the fourth input of adder 509. Thus, if the two base register values are not updated completely, the four inputs of adder 509 are the second base register value, the first base address difference value, the first base register value and the second base address difference value, respectively. If the first base register value is updated completely and the second base register value is not updated completely, the four inputs of adder 509 are the second base register value, '0', the first base register value and the second base address difference value, respectively. If the second base register value is updated completely and the first base register value is not updated completely, the four inputs of adder 509 are the second base register value, the first base address difference value, the first base register value and '0', respectively. If the two base register values are updated completely, the four inputs of adder 509 are the second base register value, '0', the first base register value, and '0', respectively. After the output of adder 509 is selected by selector 521, the output sent to data block address storage comparator 127 as data address 146. Thus, the data address can be obtained by adding the two base register values.

In addition, when CPU 101 executes the data read instruction to generate actual data address 144, selector 533 selects the first base address difference value as an output. The output selected by selector 529 is used as the first input of adder 511. Selector 531 selects the second base address difference value as the second input of adder 511. Selector 527 selects actual data address 144 as the third input of adder 511. At this point, the output of adder 511 is prediction data address 519 corresponding to the data read instruction. The prediction data address 519 is selected by selector 521 and sent to the data block address storage comparator 127 to control the filling of data cache 113.

For any situation that calculates the possible data address when the base register is not updated completely, when CPU 101 executes the data read instruction to generate actual data address 144, comparator 147 needs to compare the calculated data address with actual data address 144 to determine whether the calculated data address is correct. If the comparison result is equal, data provided in advance by data cache 113 for CPU 101 is the needed data. If the comparison result is not equal, selector 533 selects '0' as an output. The output is selected by selector 529 and outputted as the first input of adder 511. Selector 531 selects '0' output as the second input of adder 511. Selector 527 selects actual data address 144 as the third input of adder 511. At this point, the output 519 of adder 511 is the value of actual data address 144. The data address 519 is selected by selector 521 and is sent to the data block address storage comparator 127 as data address 146 to control data cache 113 to output the data actually needed by CPU 101.

For a multiple data read instruction, the first data address can be calculated based on the above described method. Based on the first data address, data cache 113 is controlled to provide data for CPU 101. At the same time, the data address 517 is temporally stored in register 513. Then, selector 523 selects '0' as the first input of adder 509. Based on the corresponding change direction of multiple data addresses, selector 529 selects '1' or '−1' as the second input of adder 509. For example, if the data addresses of the multiple data read instruction are incremented, selector 529 selects '1' as an output; if the data addresses of the multiple data read instruction are decremented, selector 529 selects '−1' as an output. For illustration purposes, '1' and '−1' is used as a variation of the address increment or decrement. For a different instruction set architecture, any other appropriate value can also be used as a variation of the address increment or decrement.

Selector 525 selects the data address from register 513 as the third input of adder 509. Selector 531 selects '0' as the fourth input of adder 509. Thus, the output of adder 509 is the second data address. The second data address is selected by selector 521 and sent to data block address storage comparator 127 to control data cache 113 to provide the second data for CPU 101, and so on. Therefore, before CPU 101 executes the multiple data read instruction, data cache 113 can provide multiple data for CPU 101 in advance.

Similarly, if the data address is calculated when the base register of the multiple data read instruction is not updated completely, comparator 147 needs to compare the first data address obtained by calculation with actual data address 144 to determine whether the obtained first data address is correct. If the comparison result is equal, the multiple data provided in advance by data cache 113 for CPU 101 is the needed data. If the comparison result is not equal, selector 533 selects '0' as an output. The output is selected by selector 529 and outputted as the first input of adder 511. Selector 531 selects '0' output as the second input of adder 511. Selector 527 selects actual data address 144 as the third input of adder 511. At this point, the output 519 of adder 511 is the value of actual data address 144 (i.e. the value of the actual first data address). The data address 519 is selected by selector 521 and sent to data block address storage comparator 127 as data address 146 to control data cache 113 to output the first data actually needed by CPU 101.

At the same time, the actual first data address is temporally stored in register 515. Then, based on the corresponding change direction of multiple data addresses, selector 529 selects '1' or '−1' as the first input of adder 511. Selector 531 selects '0' as the second input of adder 511. Selector 527 selects the actual first data address temporally stored in register 515 as the third input of adder 511. Thus, the output of adder 511 is the actual second data address. The second data address is selected by selector 521 and sent to data block address storage comparator 127 to control data cache 113 to output the actual second data address for CPU 101, and so on. Thus, based on the possible data, under the situation that the address data provided in advance by data cache 113 is incorrect, data cache 113 provides multiple data for CPU 101 by the correct multiple data addresses to ensure the proper operation of CPU 101.

In addition to the above situations, other data address generating methods can be considered as special cases or extension of these five situations. The similar method can be implemented, which are not repeated herein.

Figure 6:
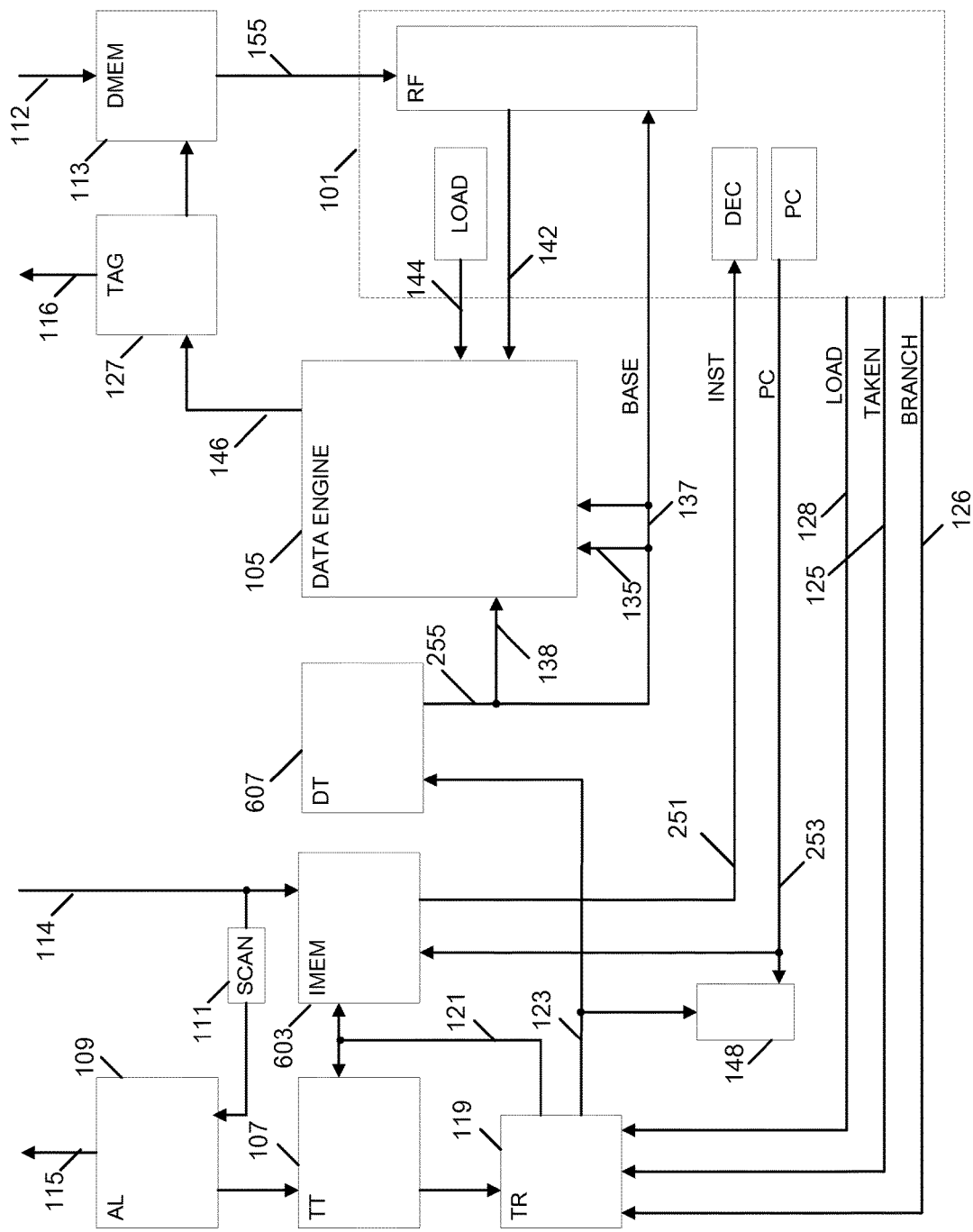
FIG. 6 illustrates a schematic diagram of another exemplary data cache system consistent with the disclosed embodiments.

FIG. 6 illustrates a schematic diagram of another exemplary data cache system consistent with the disclosed embodiments. As shown in FIG. 6, the data cache system may include a CPU 101, an active list 109, a data block address storage comparator 127, a scanner 111, an instruction track table 107, a data track table 607, a tracker 119, an instruction cache 603, a data cache 113, a data engine 105 and a time point detection module 148. It is understood that the disclosed components or devices are for illustrative purposes and not limiting, certain components or devices may be omitted and other components or devices may be included. Further, the various components may be distributed over multiple systems, may be physical or virtual, and may be implemented in hardware (e.g., integrated circuitry), software, or a combination of hardware and software.

CPU 101, active list 109, data block address storage comparator 127, scanner 111, instruction track table 107, tracker 119, data cache 113, data engine 105 and time point detection module 148 are the same as the corresponding components in FIG. 4. Instruction cache 603 is the same as a regular instruction cache. Instruction cache 603 only includes instructions; instruction cache 603 does not include instruction type information corresponding to every instruction.

There is a one-to-one correspondence between a row in data track table 607 and a memory block in instruction cache 603. Both the row and the memory block are pointed to by the same pointer. The data track table 607 includes a plurality of track points. A track point is a single entry in the data track table 607, containing information of at least one instruction, such as instruction type, branch target address, etc. The instruction type information may also indicate which kind of data read instruction the corresponding instruction is, thus containing information on how to calculate a data address, such as position information of base address register number and address offset in instruction code, etc. When information contained in a track point indicates the track point corresponds to at least one data read instruction, the track point is a data point.

BNX provided by read pointer 121 of tracker 119 and column address provided by read pointer 123 together point to a track point in data track table 607. Based on instruction type information read out from the track point, read pointer 123 is controlled to move and point to the first data read instruction after the current instruction according to the same method in FIG. 2. Data track table 607 provides base address register number 137, address offset 138 contained in the data point pointed to by read pointer 123, target register number 135 of a number of instructions before the data point passed by read pointer 123 for data engine 105. The calculation of the subsequent data address and the prediction data address, and the operation process for providing data in advance and prefetching data are the same as the corresponding process in FIG. 4, which are not repeated herein.

In addition, the data point in the data track table may only store instruction type information. Read pointer 123 points to the data point in the track table and the corresponding data read instruction in instruction cache 103 at the same time. Instruction cache 103 provides the address offset and the base register number to implement the same function in FIG. 6.

Furthermore, the data address obtained by calculating in advance can be stored in the data point in data track table 607. Thus, when read pointer 123 of tracker 119 points to a data point, the data address can be read out directly from the data point and sent to data block address storage comparator 127 to perform a matching operation.

Alternatively, after the data address obtained by calculating in advance is matched in data block address storage comparator 127, the obtained cache block number of data cache 113 and an address offset are stored in the data point. Thus, when read pointer 123 of tracker 119 points to a data point, based on the cache block number and the address offset read out from the data point, the needed data may be found in data cache 113.

It should be noted that, for ease of description, both the instruction track table and the data track table are included in FIG. 6. In the practical application, the instruction track table and the data track table can be combined into one track table. At this point, the track table contains both the branch point and the data point. Read pointer 121 and read pointer 123 of tracker 119 perform an addressing operation on the track table and read out the corresponding branch point information and data point information. This implementation should also be included in the disclosure.

In addition, under the situation that the data track table or the track table contains both branch points and data points, when the base register value is used as the data address, '0' can be directly stored in the corresponding data point. When read pointer 123 points to the data point, the stored '0' is outputted as an address offset and sent to adder 129 to perform an address calculation operation.

For situation that the data address is obtained by adding an instruction address value to an address offset, because the address and address offset of the data read instruction are kept unchanged, so when scanner 111 scans and finds the instruction, the data address can be obtained directly by adding the address offset to the instruction address, and stored in the corresponding data point. When read pointer 123 points to the data point, the data address is directly sent to data block address storage comparator 127 to perform an address matching operation.

In addition, the base address difference value may also be stored in the data track table. Specifically, the base address difference value corresponding to every data read instruction is generated by using the previous described method. The base address difference value is stored in the corresponding data point. Thus, the base address difference memory can be omitted. Also, there is one base address difference value corresponding to every data read instruction, more accurately calculating the possible data address and the prediction data address.

As only some instructions in one instruction block are branch instructions or data read instructions, instruction track table 107 and/or data track table 607 can be compressed, thus reducing instruction track table 107 and/or data track table 607 demand for storage space. For example, a compress track table may have the same rows as an original track table, but the number of columns in the compress track table is less than the number of columns in the original track table. A mapping table can be used to store the corresponding relationship between the rows in the compress track table and rows in the original track table.

Figure 7:
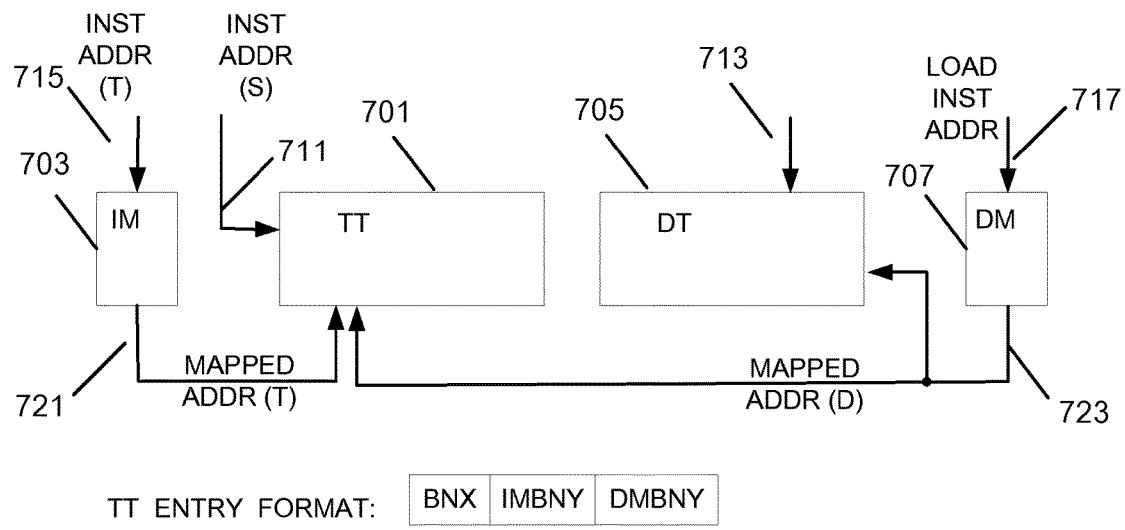
FIG. 7 illustrates a schematic diagram of an exemplary compress track table application consistent with the disclosed embodiments.

FIG. 7 illustrates a schematic diagram of an exemplary compress track table application consistent with the disclosed embodiments. As shown in FIG. 7, the data cache system may include an instruction track table 701, an instruction mapping table 703, a data track table 705, and a data mapping table 707. It is understood that the disclosed components or devices are for illustrative purposes and not limiting, certain components or devices may be omitted and other components or devices may be included. Further, the various components may be distributed over multiple systems, may be physical or virtual, and may be implemented in hardware (e.g., integrated circuitry), software, or a combination of hardware and software.

Instruction track table 701 and data track table 705 are the compressed track table in the present embodiment. There is a one-to-one correspondence between a row in instruction track table 701 and a row in data track table 705. Both the row and the memory block are pointed to by the same pointer. Instruction track table 701 and data track table 705 may have the same number of rows as an original track table. That is, the row address of the track address in instruction track table 701 and data track table 705 is still BNX.

Every table entry in instruction track table 701 (or data track table 705) is a branch point (or a data point), and corresponds in order according to the order of the corresponding branch instruction (or the data read instruction) in the instruction block. The table entries in instruction mapping table 703 (or data mapping table 707) and branch points (or data points) in instruction track table 701 (or data track table 705) are a one-to-one correspondence. The table entry in instruction mapping table 703 (or data mapping table 707) stores the block offset in the instruction block of the corresponding branch point (or a data point). Thus, after a block offset of a branch instruction (or a data read instruction) in the instruction block is converted into a column address via the instruction mapping table, based on the column address, a corresponding branch point (or a data point) can be found in the row pointed to by BNX of the branch instruction (or the data read instruction) in instruction track table 701 (or data track table 705). For any branch point (or any data point) in instruction track table 701 (or data track table 705), a block offset of the branch instruction (the data read instruction) corresponding to the branch point (or the data point) can also be found in the corresponding table entry of instruction mapping table 703 (or data mapping table 707). The block offset and BNX of the branch point (or the data point) together constitute the branch instruction (or the data read instruction) corresponding to the branch point (or the data point) in the instruction cache.

Because the number of columns in both instruction track table 701 and data track table 705 is less than the number of columns in the original track table, and columns of instruction track table 701 may not correspond to columns of data track table 705, the column address of the track address in instruction track table 701 is IMBNY in order to distinguish the track address in the original track table, and the IMBNY corresponds to a column address of the original instruction track table via instruction mapping table 703; the column address of the track address in data track table 705 is DMBNY, and the DMBNY corresponds to a column address of the original data track table via data mapping table 707. At this point, entry contents of instruction track table 701 include the BNX, IMBNY and DMBNY corresponding to the branch target instruction, where BNX and IMBNY together represent the track address of the branch point of the first branch instruction after the branch target instruction of the branch instruction corresponding to the table entry in instruction track table 701, and BNX and DMBNY together represent the track address of the branch point of the first data read instruction after the branch target instruction of the branch instruction corresponding to the table entry in data track table 705.

Branch instruction address 711 contains the row address (i.e. BNX) of the branch instruction in the track table and the position offset of the branch instruction in the instruction block (i.e. BNX and the column address). When a new track of track table 701 is established according to an instructions block, the row address part (BNX) of branch instruction address 711 points out a row of instruction track table 701, and the first idle unit in the row in order is used as the branch point corresponding to the branch instruction. At the same time, the block offset of branch instruction address 711 (that is, the position offset of the branch instruction in the instruction block) is stored in the corresponding table entry in instruction mapping table 703 using the previous described method.

The block offset of branch target instruction address 715 of the branch instruction is sent to a row pointed to by BNX of instruction address 715 in instruction mapping table 703 to compare with all stored block offsets. The column address of the first block offset stored in the row that is greater than or equal to the block offset of instruction address 715 is used as a column address IMBNY corresponding to instruction address 715, thereby forming the track address (BNX, and IMBNY) of instruction address 715 in instruction track table 701. Track address 721 is stored in the branch point (that is, the table entry corresponding to the branch instruction in the instruction track table 701).

Similarly, the block offset of instruction address 717 of the first data read instruction after the branch target instruction of the branch instruction is sent to data mapping table 707 is converted into column address DMBNY of data track table 705 by the same method. The column address and BNX of track address 721 together constitute track address 723 of the data read instruction in data track table 705.

The corresponding information 713 of the data read instruction is stored in the table entry pointed to by track address 723 in data track table 705. That is, the corresponding information 713 of the data read instruction is stored in the corresponding data point. DMBNY of track address 723 is also sent to instruction track table 701 and stored in the branch point. Thus, the contents of the branch point corresponding to the branch instruction include BNX, IMBNY, and DMBNY, where BNX and IMBNY together point to the first branch point after the branch target instruction of the branch instruction, and BNX and DMBNY together point to the first data point after the branch target instruction of the branch instruction in data track table 705.

Thus, the contents of a table entry in instruction track table 701 is generated and stored completely. Then, when the read pointer of the tracker points to the table entry, the track address of the first branch instruction after the branch target instruction of the branch instruction in instruction track table 701 can be read out from the table entry. Therefore, the track containing the branch target instruction and the first branch point after the branch target instruction can be found directly in instruction track table 701. At the same time, the track address in data track table 705 of the first data read instruction after the branch target instruction of the branch instruction can be read out from the table entry. Thus, after the branch instruction takes a branch, the data point corresponding to the data read instruction can be found from data track table 705 by directly using the track address. The related information of the data read instruction can be read out from the data point (such as instruction type or data address, and so on) to perform the corresponding subsequent operations.

After using the track table compression technology, every entry in the data track table is a data point. Read pointer 123 increases by 1 every time and points to a data point. Therefore, an additional increment logic is needed to point to a number of instructions before the data read instruction in the instruction cache 103, and send the target register values of these instructions to judgment module 133 to perform correlation judgments. The increment logic is similar as the structure constituted by register 241, incrementer 243, and selector 245 in tracker 119, which is not repeated herein.

A data read buffer (DRB) may be added to temporarily store data read out in advance from data cache 113. The data read buffer is configured to store multiple data read out from data cache 113 in advance based on the value of read pointer 123, and the data addresses corresponding to these data. When CPU 101 executes the data read instruction and calculates the actual data address, the actual data address is compared with the data address corresponding to the data provided by the read data buffer for CPU 101 using the previous described method, determining whether the data is the data needed by the data read instruction.

Thus, read pointer 123 can move to the next data read instruction without waiting for completion of the execution of the first data read instruction after the current instruction. That is, after outputting the data needed by the first data read instruction to the data read buffer, read pointer 123 can move to the next data read instruction. The data needed by the subsequent data read instruction is filled and obtained in advance, so as to make full use of output bandwidth of data cache 113 to further reduce latency caused by the data cache miss and the time needed for accessing the data cache.

Similarly, the data read buffer may only store base register value instead of a full data address. When CPU 101 executes the data read instruction, CPU 101 compares the generated actual base register value with the base register value corresponding to data provided by the data read buffer for CPU 101, thereby determining whether the data is the data needed by the data read instruction.

In addition, a tag bit can be added for every data address (or base register value) in the data read buffer. The tag bit indicates whether the data address (or base register value) is a determination data address (or a determination base register value) or a possible data address (or a possible base register value). In this situation, when CPU 101 executes the data read instruction, CPU 101 only compares the generated actual data address (or actual base register value) with the possible data address (or the possible base register value) corresponding to data provided by the data read buffer for CPU 101 to determine whether the data is the data needed by the data read instruction, thereby reducing the number of comparisons.

An instruction read buffer (IRB) may be added to store at least one instruction block including the current instruction block. The instruction read buffer is pointed to by instruction address 253 and can output instructions for CPU 101. The data read buffer and the instruction read buffer may provide the corresponding data for CPU 101 in synchronization. That is, when CPU 101 reads out a data read instruction from the instruction read buffer, CPU 101 can read simultaneously the data needed for the data read instruction from the corresponding position of the data read buffer.

Figure 8A:
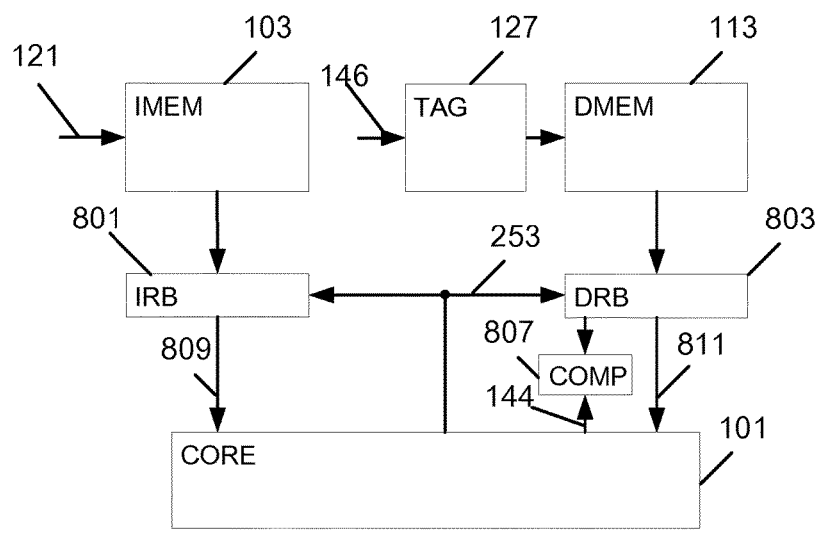
FIG. 8A illustrates a schematic diagram of an exemplary cooperation operation for an instruction read buffer and a data read buffer consistent with the disclosed embodiments.

FIG. 8A illustrates a schematic diagram of an exemplary cooperation operation for an instruction read buffer and a data read buffer consistent with the disclosed embodiments. It is understood that the disclosed components or devices are for illustrative purposes and not limiting, certain components or devices may be omitted and other components or devices may be included.

As show in FIG. 8A, an instruction read buffer 801 is added between instruction cache 103 and CPU 101; and the instruction read buffer 801 is used to temporally store the instruction block currently executed by CPU 101. Based on instruction address 253 sent from CPU 101, the instruction read buffer provides the corresponding instruction for CPU 101 to execute via bus 809. The number of table entries in data read buffer 803 is equal to the number of instructions in instruction read buffer 801, and every table entry in data read buffer 803 one-to-one corresponds to every instruction in instruction read buffer 801. That is, if an instruction in instruction read buffer 801 is a data read instruction, the corresponding table entry in data read buffer 803 is used to store the data corresponding to the data read instruction; otherwise, information that is stored in the corresponding table entry in data read buffer 803 is invalid. Thus, a relationship between instruction read buffer 801 and data read buffer 803 is established. That is, a relationship between the data read instruction and the corresponding data is established.

After read pointer 123 of tracker 119 controls data cache 113 to output data that is needed by the first data read instruction after the current instruction to data read buffer 803, read pointer 123 moves to the next data read instruction and controls data cache 113 to output the corresponding data to data read buffer 803. At the same time, data address 146 generated by data engine 105 is stored in the corresponding position in data read buffer 803, until data and data addresses corresponding to all data read instructions in the current instruction block are outputted and stored in data read buffer 803. Thus, based on instruction address 253 outputted by CPU 101, data corresponding to the data read instruction pointed to by instruction address 253 in instruction read buffer 801 can be found in data read buffer 803. Therefore, based on instruction address 253, the instruction is read out from instruction read buffer 801. When the instruction is a data read instruction, based on instruction address 253, the corresponding data can be read out from data read buffer 803 for CPU 101 to execute via bus 811 at the same time. The data address corresponding to the data is read out and sent to selector 807 to compare with the calculated actual data address when CPU 101 executes the data read instruction, thereby determining whether the data is the data needed for the data read instruction.

Figure 8B:
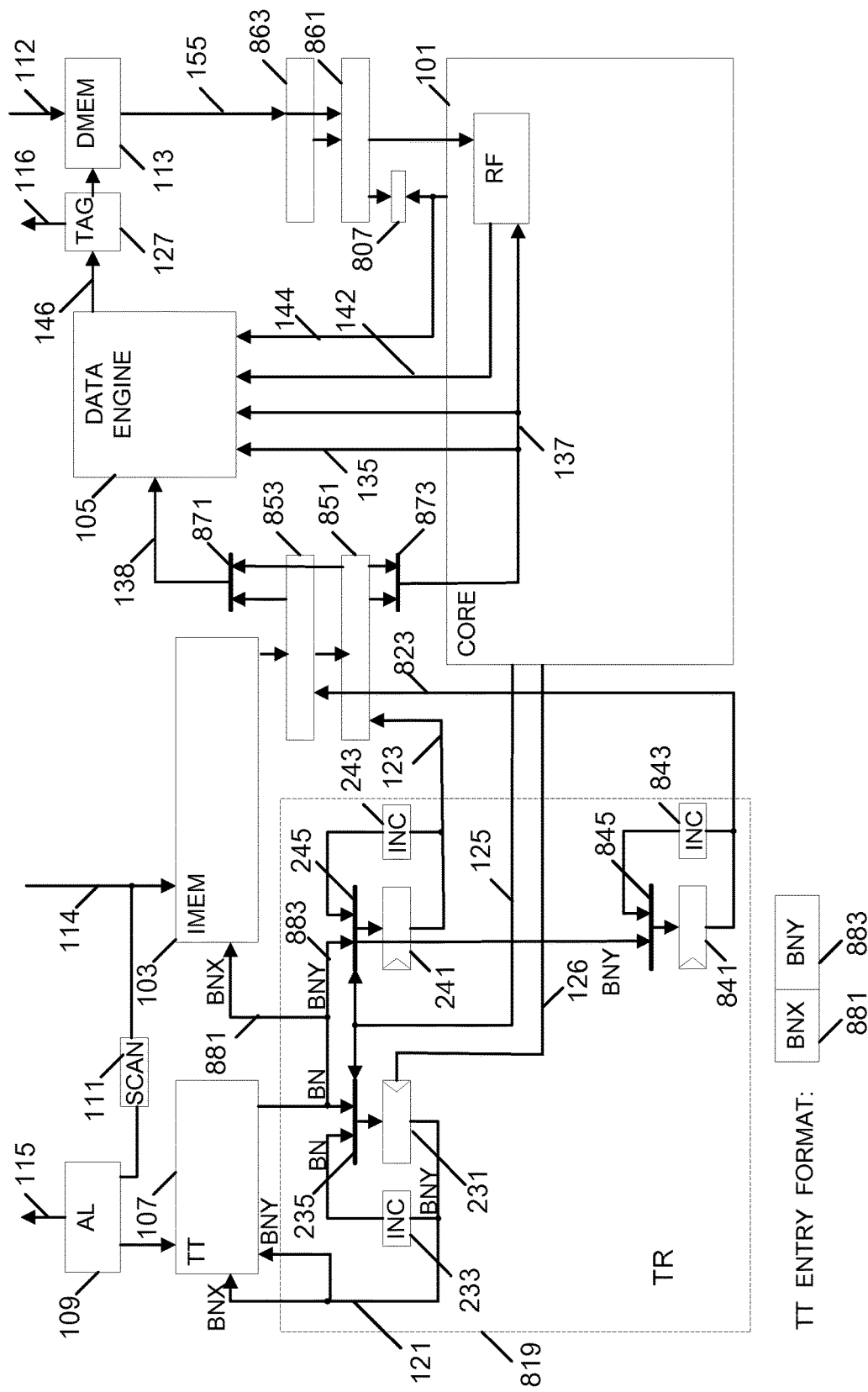
FIG. 8B illustrates a schematic diagram of another exemplary cooperation operation for an instruction read buffer and a data read buffer consistent with the disclosed embodiments.

Furthermore, the number of storage blocks in the instruction read buffer and the data read buffer may be increased appropriately in order to achieve better performance. FIG. 8B illustrates a schematic diagram of another exemplary cooperation operation for an instruction read buffer and a data read buffer consistent with the disclosed embodiments. As shown in FIG. 8B, instruction track table 107 is an uncompressed track table. An instruction read buffer consists of two storage blocks, where storage block 851 stores the current instruction block, and storage block 853 stores the target instruction block of the first branch instruction after the current instruction. The data read buffer consists of two storage blocks, where storage block 861 stores the data corresponding to the data read instruction in the current instruction block, and storage block 863 stores the data corresponding to the data read instruction in the target instruction block.

Register 231, incrementer 233, selector 235, register 241, incrementer 243, and selector 245 in tracker 819 are the same as the corresponding components in FIG. 2 and generates read pointer 121 of the current track in instruction track table 107 and read pointer 123 of the current instruction block (i.e. storage block 851) in the instruction read buffer. The difference is that register 841, incrementer 843, and selector 845 are added in tracker 819, and register 841, incrementer 843, and selector 845 generate read pointer 823 of the target instruction block (i.e. storage block 853) of the first branch instruction after the current instruction in the instruction read buffer.

Because the current instruction block is stored in storage block 851, a row address pointing to instruction cache 103 is not BNX from read pointer 121 but a row address 881 (i.e. BNX) of the target instruction track point in the branch point pointed to by read pointer 121. Thus, once read pointer 121 points to a new branch point, based on row address 881 of the target instruction track point in the branch point, the target instruction block is read out from instruction cache 103 and stored in storage block 853.

Selector 871 is configured to select one of address offsets sent out from storage block 851 and storage block 853 as address offset 138 and send address offset 138 to the data engine. Selector 873 is configured to select one of base register numbers sent out from storage block 851 and storage block 853 as base register number 137 and send base register number 137 to the data engine and CPU 101. Similar to the method described in the previous embodiments, read pointer 123 points to various data read instructions in storage block 851 in order, and the corresponding data address 146 generated by data engine 105 controls data cache 113 to store data corresponding to the data read instruction in the corresponding position in storage block 861. The data address corresponding to the data is stored in the corresponding position in storage block 861. When CPU 101 executes the data read instruction to generate actual data address 144, comparator 807 compares actual data address 144 with the data address corresponding to the data outputted by storage block 861 to determine whether the data is correct. Read pointer 823 points to various data read instructions in order from the branch target instruction in storage block 853. The corresponding data address 146 generated by data engine 105 controls data cache 113 to store data corresponding to the data read instruction in the corresponding position in storage block 863. The data address corresponding to the data is stored in the corresponding position in storage block 863.

In the above process, a certain arbitration method can be used to prevent the conflicts caused when different instruction blocks output the base register number and the address offset at the same time. For example, at the beginning, selector 871 and selector 873 select a base register number and an address offset corresponding to the data read instruction in the storage block 851 and send the base register number and the address offset to data engine 105 to calculate the data address. Then, selector 871 and selector 873 select a base register number and an address offset corresponding to the data read instruction in the storage block 853 and send the base register number and the address offset to data engine 105 to calculate the data address. Any other appropriate arbitration methods may be used herein.

Thus, the data corresponding to the data read instruction in the current instruction block and the target instruction block are stored in advance in the data read buffer. Read pointer 121 points to the first branch point after the current instruction, and controls instruction cache 103 to store the instruction block containing the target instruction of the branch instruction in storage block 853 based on row address 881 of the track address of the branch target instruction read out from the branch point.

Read pointer 123 moves along storage block 851 and points to various subsequent data read instructions. The corresponding data address 146 generated by data engine 105 controls data cache 113 to store data corresponding to the data read instruction in the corresponding position in storage block 861. The data address corresponding to the data is stored in the corresponding position in storage block 861.

Selector 845 is configured to select column address 883 (i.e. BNY) of the track address of the branch target instruction as a new value of read pointer 823. Read pointer 823 moves and points to various subsequent data read instructions from the branch target instruction along with storage block 853. The corresponding data address 146 generated by data engine 105 controls data cache 113 to store data corresponding to the data read instruction in the corresponding position in storage block 863. The data address corresponding to the data is stored in the corresponding position in storage block 863.

If CPU 101 executes the first branch instruction after the current instruction and the branch instruction does not take a branch, read pointer 121 continues to move and points to the next branch point, and controls instruction cache 103 to store the instruction block containing the target instruction of the branch instruction in storage block 853 based on row address 881 of the track address of the branch target instruction read out from the branch point. Read pointer 123 continues to move along storage block 851 until data corresponding to all subsequent data read instructions is completely stored in the corresponding position in storage block 861.

Because read pointer 121 points to a new branch point, selector 845 selects column address 883 of the track address of the branch target instruction as a new value of read pointer 823. Read pointer 823 moves along storage block 853 and points to various subsequent data read instructions from the branch target instruction. The corresponding data address 146 generated by data engine 105 controls data cache 113 to store data corresponding to the data read instruction in the corresponding position in storage block 863. The data address corresponding to the data is stored in the corresponding position in storage block 863.

If CPU 101 executes the first branch instruction after the current instruction and the branch instruction takes a branch, the instruction block in storage block 853 is stored in storage block 851 to update the current instruction block. Selector 245 selects column address 883 of the track address of the original branch target instruction as a new value of read pointer 823. Read pointer 123 moves along storage block 851 and points to various subsequent data read instructions from the new current instruction. The corresponding data address 146 generated by data engine 105 controls data cache 113 to store data corresponding to the data read instruction in the corresponding position in storage block 861. The data address corresponding to the data is stored in the corresponding position in storage block 861.

At the same time, read pointer 121 moves along the new current track from the track point (i.e. original branch target track point) of the new current instruction until read pointer 121 reaches the first branch point, and controls instruction cache 103 to store the instruction block containing the target instruction of the branch instruction in storage block 853 based on row address 881 of the track address of the branch target instruction address read out from the branch point.

Because read pointer 121 points to a new branch point, selector 845 selects column address 883 of the track address of the new branch target instruction as a new value of read pointer 823. Read pointer 823 moves along storage block 853 and points to various subsequent data read instructions from the branch target instruction. The corresponding data address 146 generated by data engine 105 controls data cache 113 to store data corresponding to the data read instruction in the corresponding position in storage block 863. The data address corresponding to the data is store in the corresponding position in storage block 863.

When calculating the data address of the data read instruction pointed to by read pointer 823, the corresponding base register value probably is not updated, therefore data stored in storage block 863 is very likely wrong. After a branch is taken and data in storage block 863 is stored in storage block 861, read pointer 123 moves from the target instruction of the branch instruction in storage block 851 until read pointer 123 points to the data read instruction again according to the same method in the previous embodiments. The corresponding data address generated by data engine 105 controls data cache 113 to update the storage block, improving accuracy of data stored in advance in the data read buffer.

Based on the distance between the data read instruction and the instruction that changes corresponding base register value last before the data read instruction, the data read instructions are classified. The 3 cycles in the embodiments shown in FIG. 3A are as an example herein. During the process of read pointer 123 or read pointer 823 moving, the distance between the data read instruction and the instruction that changes the corresponding base register value last before the data read instruction is determined. When the distance between the data read instruction and the instruction that changes corresponding base register value last before the instruction is greater than 3, the data read instruction is classified as 'farther' instructions. When the distance between the data read instruction and the instruction that changes corresponding base register value last before the instruction is less than or equal to 3, the data read instruction is classified as 'closer' instructions. For the 'farther' instructions, when CPU 101 actually executes the 3 instructions before the data read instruction, data engine 105 calculates a determination data address and controls data cache 113 to output the corresponding data to the data read buffer, thus hiding entirely access latency of data cache 113. For the 'closer' instructions, in order to hide access latency of data cache 113 as much as possible, data engine 105 calculates a possible data address in advance (i.e. before the 3 instructions) and controls data cache 113 to output the corresponding data to the data read buffer.

Thus, in the process that read pointer 823 moves along instructions in storage block 853, if read pointer 823 points to a 'farther' instruction, the 'farther' instruction is omitted; if read pointer 823 points to a 'closer' instruction, data engine 105 directly calculates a possible data address and controls data cache 113 to output the corresponding data to the data read buffer. Then, read pointer 823 continues to move and points to the next data read instruction.

In the process that read pointer 123 moves along instructions in storage block 851, if read pointer 123 points to a 'farther' instruction, data engine 105 calculates a determination data address and controls data cache 113 to output the corresponding data to the data read buffer until CPU 101 executes 3 instructions before the data read instruction, hiding access latency of data cache 113; if read pointer 123 points to a 'closer' instruction, the instruction may be omitted because the corresponding data is obtained from data cache 113 based on the possible data address. Then, read pointer 123 continues to move and points to the next data read instruction.

Or, in the process that read pointer 823 moves along instructions in storage block 853, data engine 105 only calculates possible data addresses corresponding to 'closer' instructions, and controls data cache 113 to output the corresponding data to the data read buffer. In the process that read pointer 123 moves along instructions in storage block 851, data engine 105 calculates data addresses for all data read instructions, and controls data cache 113 to output the corresponding data to the data read buffer.

Or, in the process that read pointer 823 moves along instructions in storage block 853, data engine 105 only calculates possible data addresses corresponding to 'farther' instructions, and controls data cache 113 to output the corresponding data to the data read buffer. In the process that read pointer 123 moves along instructions in storage block 851, data engine 105 only calculates possible data addresses corresponding to 'closer' instructions, and controls data cache 113 to output the corresponding data to the data read buffer.

Or, in the process that read pointer 823 moves along instructions in storage block 853, data engine 105 only calculates possible data addresses corresponding to 'farther' instructions, and controls data cache 113 to output the corresponding data to the data read buffer. In the process that read pointer 123 moves along instructions in storage block 851, data engine 105 calculates data addresses for all data read instructions, and controls data cache 113 to output the corresponding data to the data read buffer.

In addition, a tag bit can be added for every data read instruction in the target instruction block. The tag bit indicates that the data corresponding to the data read instruction is stored in the data read buffer. In this situation, when read pointer 123 moves along instructions in storage block 851, data engine 105 calculates the data addresses for all data read instructions whose corresponding data is not stored in the data read buffer and controls data cache 113 to output the corresponding data to the data read buffer.

Any other appropriate policies can be used to control data cache 113 to store the data in the data read buffer, improving the accuracy of data stored in the data read buffer or reducing the number of times that wrong data is stored.

Figure 8C:
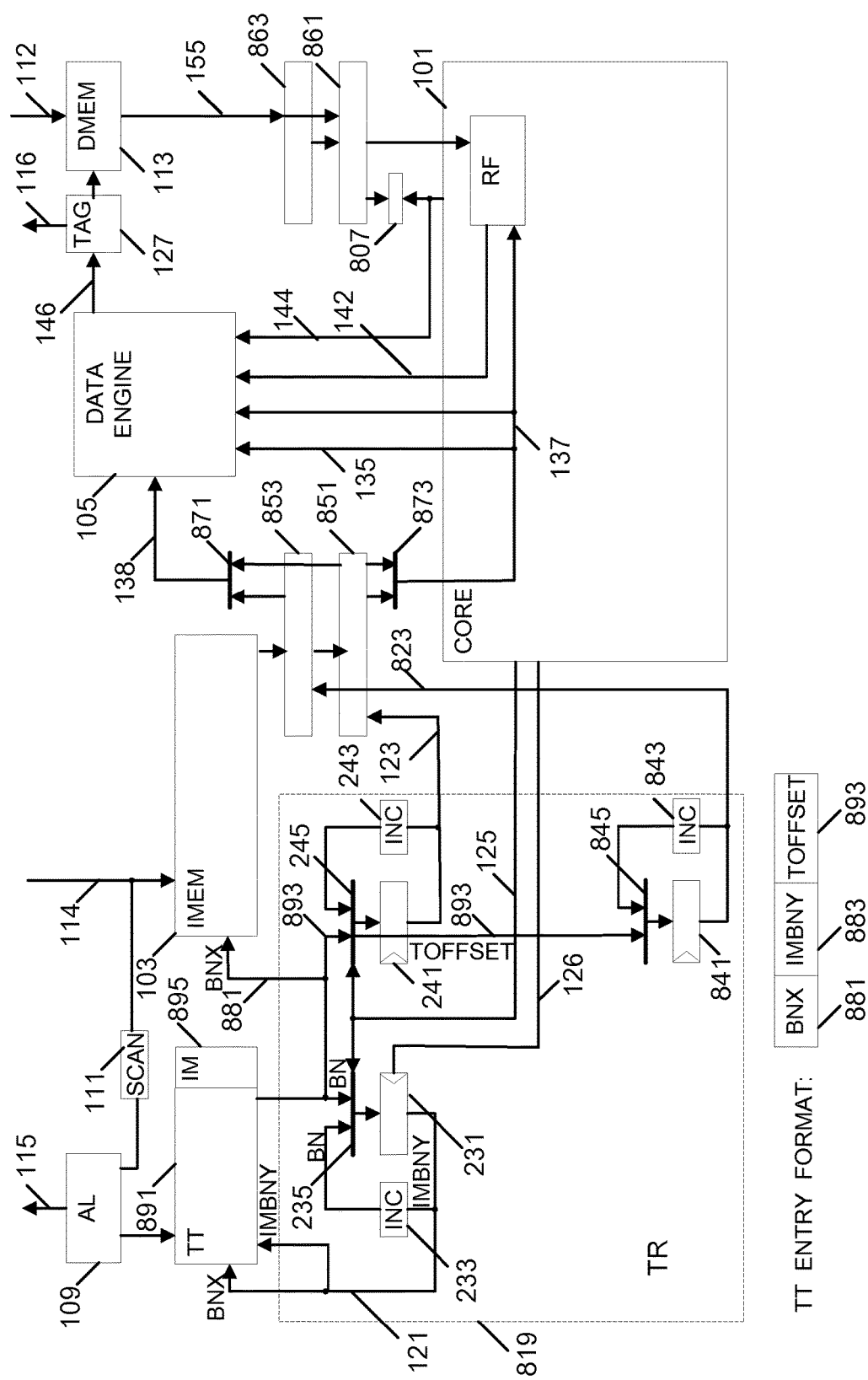
FIG. 8C illustrates a schematic diagram of another exemplary cooperation operation for an instruction read buffer and a data read buffer consistent with the disclosed embodiments.

FIG. 8C illustrates a schematic diagram of another exemplary cooperation operation for an instruction read buffer and a data read buffer consistent with the disclosed embodiments. As shown in FIG. 8C, instruction track table 891 is a compressed track table. That is, every table entry in instruction track table 891 is a branch point which corresponds to the corresponding branch instruction in the instruction block. The table entries in instruction mapping table 895 and the branch points in the instruction track table 891 are one-to-one correspondence. The table entry in instruction mapping table 895 stores the offset of the corresponding branch point in the block. Therefore, the column address in the track address in instruction track table 891 is IMBNY, and the IMBNY corresponds to a column address of the original instruction track table via instruction mapping table 895. At this point, entry contents of instruction track table 891 include BNX, IMBNY and TOFFSET, where BNX and IMBNY together represent the track address of the branch point of the first branch instruction after the branch target instruction of the branch instruction corresponding to the table entry in instruction track table 891; BNX and TOFFSET together represent a track address of the track point of the branch target instruction of the branch instruction corresponding to the table entry in the original track table; and TOFFSET represents a block offset of the branch target instruction in the instruction block containing the branch target instruction. Thus, based on TOFFSET, the branch target instruction can be found in storage block 853.

Read pointer 121 points to a branch point, and based on BNX 881 read out from the branch point, read pointer 121 controls instruction cache 103 to store the instruction block containing the target instruction of the branch instruction in storage block 853.

Read pointer 123 moves along storage block 851 and points to various subsequent data read instructions. The corresponding data address 146 generated by data engine 105 controls data cache 113 to store data corresponding to the data read instruction in the corresponding position in storage block 861. The data address corresponding to the data is stored in the corresponding position in storage block 861.

Selector 845 selects TOFFSET 893 read out from the branch point as a new value of read pointer 823. Read pointer 823 moves along storage block 853 from the branch target instruction and points to various subsequent data read instructions. The corresponding data address 146 generated by data engine 105 controls data cache 113 to store data corresponding to the data read instruction in the corresponding position in storage block 863. The data address corresponding to the data is stored in the corresponding position in storage block 863.

If CPU 101 executes the first branch instruction after the current instruction and the branch instruction does not take a branch, IMBNY of read pointer 121 is added 1 and points to the next branch point of the same track, and controls instruction cache 103 to store the instruction block containing the target instruction of the branch instruction in storage block 853 based on BNX 881 read out from the branch point. Read pointer 123 continues to move along storage block 851 until data corresponding to all the subsequent data read instructions is completely stored in the corresponding position in storage block 861.

Because read pointer 121 points to a new branch point, selector 845 selects TOFFSET 893 read out from the branch point as a new value of read pointer 823. Read pointer 823 moves along storage block 853 from the branch target instruction and points to various subsequent data read instructions. The corresponding data address 146 generated by data engine 105 controls data cache 113 to store data corresponding to the data read instruction in the corresponding position in storage block 863. The data address corresponding to the data is stored in the corresponding position in storage block 863.

If CPU 101 executes the first branch instruction after the current instruction and the branch instruction takes a branch, the instruction block in storage block 853 is stored in storage block 851 to update the current instruction block. Selector 245 selects TOFFSET 893 read out from the original branch point as a new value of read pointer 823. Read pointer 123 moves along storage block 851 from the new current instruction (i.e. the branch target instruction of the original branch point) and points to various subsequent data read instructions. The corresponding data address 146 generated by data engine 105 controls data cache 113 to store data corresponding to the data read instruction in the corresponding position in storage block 861. The data address corresponding to the data is stored in the corresponding position in storage block 861.

At the same time, selector 235 selects BNX 881 and IMBNY 883 read out from the branch point as a new value of read pointer 121. Read pointer 121 directly points to the new branch point (i.e. the first branch point after the original branch target instruction). Based on BNX 881 read out from the new branch point, read pointer 121 controls instruction cache 103 to store the instruction block containing the target instruction corresponding to the new branch point in storage block 853, and waits for a branch determination result generated by the branch instruction executed by CPU 101.

Because read pointer 121 points to a new branch point, selector 845 selects TOFFSET 893 read out from the new branch point as a new value of read pointer 823. Read pointer 823 moves along storage block 853 from the branch target instruction of the new branch point and points to various subsequent data read instructions. The corresponding data address 146 generated by data engine 105 controls data cache 113 to store data corresponding to the data read instruction in the corresponding position in storage block 863. The data address corresponding to the data is stored in the corresponding position in storage block 863.

In the data cache system and method, a data cache is filled in advance by storing relevant information in the instruction cache or the data track table, and the data cache is controlled in advance to output the data possible to be accessed to the CPU. Therefore, waiting time caused by cache miss or/and data cache access latency is hidden completely or partially, improving the performance of the instruction processing system.

The disclosed systems and methods may also be used in various processor-related applications, such as general processors, special-purpose processors, system-on-chip (SOC) applications, application specific IC (ASIC) applications, and other computing systems. For example, the disclosed devices and methods may be used in high performance processors to improve overall system efficiency.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:
1. A data cache system, comprising:
 a central processing unit (CPU) configured to execute instructions and read data;
 a memory system configured to store the instructions and the data;

an instruction track table configured to store corresponding information of branch instructions stored in the memory system;
a tracker configured to point to a first data read instruction after an instruction currently being executed by the CPU; and
a data engine configured to calculate a data address in advance before the CPU executes the data read instruction pointed to by the tracker, and control the memory system to provide the corresponding data for the CPU based on the data address.

2. The system according to claim 1, wherein:
the memory system further includes an instruction cache, and the instruction cache is configured to store instructions for the CPU to execute and corresponding information of the data read instructions, wherein the corresponding information indicates whether the instruction is a data read instruction.

3. The system according to claim 2, wherein:
the corresponding information of the data read instruction is type information of the data read instruction; and
based on the type information, position information of a base register number and an address offset in the instruction is directly obtained.

4. The system according to claim 1, wherein:
the memory system further includes a data track table, and
the data track table is configured to store the corresponding information of the data read instructions, wherein the corresponding information indicates whether the instruction is a data read instruction; and
the rows in the data track table and the rows in the instruction track table are a one-to-one correspondence.

5. The system according to claim 4, wherein:
the corresponding information of the data read instruction is type information of the data read instructions; and
based on the type information, position information of a base register number and an address offset in the instruction is directly obtained.

6. The system according to claim 4, wherein the data track table is further configured to:
store at least one of the base register number and the address offset of the data read instruction.

7. The system according to claim 1, wherein the data engine obtains a determination data address by any one of the following methods:
adding an address offset to a base register value;
using a base register value as the determination data address;
adding an address offset to an instruction address value; and
adding multiple base register values together.

8. The system according to claim 7, further including:
a time point detection module configured to determine whether a time point is reached, wherein the data address is outputted to memory system and the data is read out and provided for the CPU at the time point.

9. The system according to claim 8, wherein:
the data engine further includes a judgment module, and the judgment module is configured to determine correlation among registers of the data read instruction and a number of the instructions before the data read instruction to determine whether the corresponding base register value is updated to the base register value needed by the data read instruction; and
when the corresponding base register value is updated to the base register value needed by the data read instruction, the determination data address calculated by the data engine controls the memory system to provide the data for the CPU.

10. The system according to claim 8, wherein:
the data engine further includes a base address difference memory, wherein every entry of the base address difference memory corresponds to one base register and is configured to store change difference of the corresponding base register.

11. The system according to claim 10, wherein the data engine obtains a possible data address by any one of the following methods:
adding the address offset to the base register value, then adding the corresponding base address difference;
adding the corresponding base address difference to the base register value; and
adding multiple base register values and the corresponding base address differences together.

12. The system according to claim 11, wherein:
the data engine further includes a judgment module, and the judgment module is configured to determine correlation among registers of the data read instruction and a number of the instructions before the data read instruction to determine whether the corresponding base register value is updated to the base register value needed by the data read instruction, wherein:
when the corresponding base register value is not updated to the base register value needed by the data read instruction, the judgment module selects the possible data address to control the memory system to provide the data for the CPU; and
when the corresponding base register value is updated to the base register value needed by the data read instruction, the judgment module selects the determination data address to control the memory system to provide the data for the CPU.

13. The system according to claim 12, wherein:
the data engine further includes a comparator, and the comparator is configured to, under the situation that the judgment module selects the possible data address to control the memory system to provide the data for the CPU, when the CPU executes the data read instruction and generates an actual data address, compare the possible data address with the actual data address to determine whether the possible data address is the same as the actual data address; and
when the possible data address is not the same as the actual data address, the data engine uses the actual data address to control the memory system to provide the data for the CPU.

14. The system according to claim 13, wherein:
before the CPU executes the data read instruction next time, the data engine is configured to calculate a prediction data address for executing the data read instruction next time in advance; and
when the data corresponding to the possible data address is not stored in the memory system, a data block containing the data is obtained from an external storage and filled to the memory system.

15. The system according to claim 14, wherein:
an adder in the data engine obtains the prediction data address by adding the actual data address and the corresponding base address difference together.

16. The system according to claim 7, wherein:
the data engine further includes a base address difference memory, wherein:

every entry of the base address difference memory corresponds to one base register and is configured to store change difference of the corresponding base register; and before the CPU executes the data read instruction, the data engine obtains the possible data address by any one of the following methods:

adding an address offset to the base register value, then adding the corresponding base address difference;

adding the corresponding base address difference to the base register value; and adding multiple base register values and the corresponding base address differences together.

17. The system according to claim 16, wherein:
the data engine further includes a comparator, and the comparator is configured to, under the situation that the judgment module selects the possible data address to control the memory system to provide the data for the CPU, when the CPU executes the data read instruction and generates an actual data address, compare the possible data address to the actual data address to determine whether the possible data address is the same as the actual data address; and when the possible data address is not the same as the actual data address, the data engine uses the actual data address to control the memory system to provide the data for the CPU.

18. The system according to claim 17, wherein:
before the CPU executes the data read instruction next time, the data engine is configured to calculate a prediction data address for executing the data read instruction next time in advance; and when the data corresponding to the possible data address is not stored in the memory system, a data block containing the data is obtained from an external storage and filled to the memory system.

19. The system according to claim 18, wherein:
an adder in the data engine obtains the prediction data address by adding the corresponding base address difference to the actual data address.

20. The system according to claim 4, wherein:
a total number of columns in any one of the instruction track table and the data track table is less than a total number of instructions in an instruction block;

every entry in the instruction track table corresponds to a branch instruction, wherein entry format contains a row address and a column address in the instruction track table of a first branch instruction from a branch target instruction in the branch target instruction block, as well as a column address in the data track table of a first data read instruction from a branch target instruction in the branch target instruction block; and every entry in the data track table corresponds to a data read instruction.

21. The system according to claim 7, further including:
a data read buffer configured to store data possibly to be used by a number of data read instructions after the current instruction for the CPU to read.

22. The system according to claim 21, further including:
an instruction read buffer configured to store one or more instruction blocks including at least the current instruction block, wherein:

a total number of table entries in the data read buffer is equal to a total number of instructions in the instruction read buffer, and every table entry in the data read buffer one-to-one corresponds to every instruction in the instruction read buffer; and the entry in the data read buffer corresponding to the data read instruction in the instruction read buffer is configured to store the data corresponding to the data read instruction.

23. The system according to claim 22, wherein:
The data read instruction and the corresponding data are read out simultaneously from the instruction read buffer and the data read buffer using any one of the instruction address and address offset of the same data read instruction.

24. The system according to claim 23, wherein:
based on the distance between the data read instruction and the instruction that updates corresponding base register value last before the data read instruction, the data read instructions are classified; and base on the classification, the data engine controls the data cache to store the data corresponding to the different types of data read instructions in the data read buffer at different time points.

25. The system according to claim 23, wherein:
information on whether the data corresponding to the data read instruction in the instruction read buffer is stored in the data read buffer is recorded; and based on the information, the data engine calculates the data address for the data read instruction corresponding to the data that is not stored in the data read buffer and controls the data cache to store the data corresponding to the data read instruction in the data read buffer.

26. A data cache method, comprising:
storing instructions and data in a memory system;
finding, by a tracker, in advance a first data read instruction after an instruction currently being executed by a CPU;
before the CPU executes the data read instruction, calculating, by a data engine, a data address in advance; and
based on the data address, controlling the memory system to provide the corresponding data for the CPU.

27. The method according to claim 26, wherein a determination data address is obtained by any one of the following methods:
adding an address offset to a base register value;
using a base register value as the determination data address;
adding an address offset to an instruction address value; and
adding multiple base register values together.

28. The method according to claim 27, further including:
comparing the address of the data read instruction with the address of the instruction currently being executed by the CPU;
determining whether a time point is reached, wherein the data address is outputted to memory system and the data is read out and provided for the CPU at the time point; and
when the corresponding base register value is updated to the base register value that is needed by the data read instruction, selecting the determination data address to control the memory system to provide the data for the CPU.

29. The method according to claim 27, further including:
recording the change differences of all base registers.

30. The method according to claim 29, wherein a possible data address is obtained by any one of the following methods:

adding the address offset to the base register value, then adding the corresponding base address difference;
adding the corresponding base address difference to the base register value; and
adding multiple base register values and the corresponding base address differences together.

31. The method according to claim 30, further including:
comparing the address of the data read instruction with the address of the instruction currently being executed by the CPU; and
determining whether a time point is reached, wherein the data address is outputted to memory system and the data is read out and provided for the CPU at the time point.

32. The method according to claim 31, further including:
determining correlation among registers of the data read instruction and a number of the instructions before the data read instruction to determine whether the corresponding base register value is updated to the base register value that is needed by the data read instruction;
when the corresponding base register value is not updated to the base register value that is needed by the data read instruction, selecting the possible data address to control the memory system to provide the data for the CPU; and
when the corresponding base register value is updated to the base register value that is needed by the data read instruction, selecting the determination data address to control the memory system to provide the data for the CPU.

33. The method according to claim 32, further including:
under the situation for selecting the possible data address to control the memory system to provide the data for the CPU, when the CPU executes an actual data address generated by the data read instruction, comparing the possible data address with the actual data address to determine whether the possible data address is the same as the actual data address; and
when the possible data address is not the same as the actual data address, using the actual data address to control the memory system to provide the data for the CPU.

34. The method according to claim 33, wherein:
before the CPU executes the data read instruction next time, calculating a prediction data address for executing the data read instruction next time in advance; and
when the data corresponding to the possible data address is not stored in the memory system, obtaining a data block containing the data from an external storage and filling the data block to the memory system.

35. The method according to claim 34, further including:
obtaining the prediction data address by adding the corresponding base address difference to the actual data address.

36. The method according to claim 27, further including:
recording the change differences of all base registers;
before the CPU executes the data read instruction, obtaining the possible data address by any one of the following methods:
adding the address offset to the base register value, then adding the corresponding base address difference;
adding the corresponding base address difference to the base register value; and
adding multiple base register values and the corresponding base address differences together;
based on the possible data address, controlling the memory system to provide the data for the CPU;
when the CPU executes the data read instruction and generates an actual data address, comparing the possible data address with the actual data address to determine whether the possible data address is the same as the actual data address; and
when the possible data address is not the same as the actual data address, using the actual data address to control the memory system to provide the data for the CPU.

37. The method according to claim 36, further including:
before the CPU executes the data read instruction next time, calculating a prediction data address for executing the data read instruction next time in advance; and
when the data corresponding to the possible data address is not stored in the memory system, obtaining a data block containing the data from an external storage and filling the data block to the memory system.

38. The method according to claim 37, further including:
obtaining the prediction data address by adding the corresponding base address difference to the actual data address.

39. The method according to claim 26, further including:
establishing a relationship between the data read instruction and the corresponding data; and
reading out the data read instruction and the corresponding data simultaneously using any one of the instruction address and address offset of the same data read instruction.

40. The method according to claim 39, further including:
based on the distance between the data read instruction and the instruction that updates the corresponding base register value last before the instruction, classifying the data read instructions; and
base on the classification, controlling the data cache to output the data corresponding to the different types of data read instructions at different time points.

41. The method according to claim 39, further including:
recording on information whether the data corresponding to the data read instruction is outputted by the data cache; and
based on the information, calculating the data address for the data read instruction corresponding to the data that is not outputted by the data cache and controlling the data cache to output the data corresponding to the data read instruction.

* * * * *